United States Patent
Yoon et al.

(10) Patent No.: US 11,836,117 B2
(45) Date of Patent: Dec. 5, 2023

(54) STORAGE DEVICE, STORAGE SYSTEM, AND METHOD OF OPERATING THE STORAGE SYSTEM

(71) Applicant: Samsung Electronics Co., Ltd., Suwon-si (KR)

(72) Inventors: Joo Hyeong Yoon, Seoul (KR); Won Woo Ro, Seoul (KR); Won Seb Jeong, Hwaseong-si (KR)

(73) Assignees: Samsung Electronics Co., Ltd., Gyeonggi-do (KR); INDUSTRY-ACADEMIC COOPERATION FOUNDATION, YONSEI UNIVERSITY, Seoul (KR)

( * ) Notice: Subject to any disclaimer, the term of this patent is extended or adjusted under 35 U.S.C. 154(b) by 95 days.

(21) Appl. No.: 17/341,613

(22) Filed: Jun. 8, 2021

(65) Prior Publication Data
US 2022/0083515 A1    Mar. 17, 2022

(30) Foreign Application Priority Data
Sep. 17, 2020    (KR) .......... 10-2020-0119822

(51) Int. Cl.
*G06F 7/00* (2006.01)
*G06F 16/18* (2019.01)
(Continued)

(52) U.S. Cl.
CPC ...... *G06F 16/1815* (2019.01); *G06F 12/0238* (2013.01); *G06F 16/144* (2019.01); *G06F 16/156* (2019.01); *G06F 2212/7201* (2013.01)

(58) Field of Classification Search
CPC ............ G06F 2212/7201; G06F 3/064; G06F 3/0659; G06F 3/0619; G06F 16/1815; G06F 12/0238; G06F 16/144; G06F 16/156
See application file for complete search history.

(56) References Cited

U.S. PATENT DOCUMENTS 4,823,261 A * 4/1989 Bank .......... G06F 9/52 700/5
7,679,133 B2 3/2010 Son et al.
(Continued)

FOREIGN PATENT DOCUMENTS

WO    WO-2007/018638 A2    2/2007
WO    WO-2015/119840 A1    8/2015

OTHER PUBLICATIONS

European Office Action dated Feb. 10, 2022 issued in corresponding European Patent Application No. 21 197 563.6.
(Continued)

*Primary Examiner* — Mohammed R Uddin
(74) *Attorney, Agent, or Firm* — Harness, Dickey & Pierce, P.L.C.

(57) ABSTRACT

A storage system includes a storage device having a non-volatile memory with a first and a second physical address and a host configured to insert a first journal logical address and a first target logical address into a journal mapping table. The storage device includes a flash mapping table storing the first journal logical address mapped to the first physical address, and the first target logical address mapped to the second physical address; a circuit configured to write the first journal data to an area of the nonvolatile memory to the first physical address corresponding to the first journal logical address according to the first mapping state, based on the journaling command; and to change the first mapping state of the flash mapping table to a second mapping state in which the first target logical address is remapped to the first physical address, based on the checkpointing command.

20 Claims, 16 Drawing Sheets

(51) Int. Cl.
*G06F 16/14* (2019.01)
*G06F 12/02* (2006.01)

(56) References Cited

U.S. PATENT DOCUMENTS

| | | | |
|---|---|---|---|
| 8,553,466 B2 | 10/2013 | Han et al. | |
| 8,559,235 B2 | 10/2013 | Yoon et al. | |
| 8,654,587 B2 | 2/2014 | Yoon et al. | |
| 8,880,788 B1 | 11/2014 | Sundaram et al. | |
| 9,213,633 B2 | 12/2015 | Canepa et al. | |
| 9,824,092 B2 | 11/2017 | Shamis et al. | |
| 9,990,277 B2 | 6/2018 | Kim et al. | |
| 10,101,930 B2 | 10/2018 | Salessi et al. | |
| 10,102,144 B2 | 10/2018 | Sundararaman et al. | |
| 10,133,764 B2 | 11/2018 | Cheru et al. | |
| 10,176,092 B2 | 1/2019 | Alcantara et al. | |
| 10,235,066 B1* | 3/2019 | Chen | G06F 3/0619 |
| 10,664,358 B1* | 5/2020 | Chen | G06F 3/0619 |
| 11,079,969 B1* | 8/2021 | Glimcher | G06F 3/0659 |
| 11,440,312 B2* | 9/2022 | Jufer | B41F 9/1081 |
| 11,440,999 B2* | 9/2022 | Balan | B01J 19/0006 |
| 2009/0210614 A1* | 8/2009 | Gorobets | G06F 12/0292 711/E12.001 |
| 2011/0233648 A1 | 9/2011 | Seol et al. | |
| 2011/0276744 A1* | 11/2011 | Sengupta | G06F 12/123 711/216 |
| 2014/0082261 A1* | 3/2014 | Cohen | G06F 11/07 711/103 |
| 2014/0325117 A1* | 10/2014 | Canepa | G06F 12/0246 711/103 |
| 2015/0046670 A1* | 2/2015 | Kim | G06F 12/0246 711/207 |
| 2015/0220439 A1* | 8/2015 | Mickens | G06F 3/0619 711/135 |
| 2016/0070652 A1* | 3/2016 | Sundararaman | G06F 3/0647 711/154 |
| 2016/0283160 A1* | 9/2016 | Trika | G06F 12/1466 |
| 2017/0010833 A1* | 1/2017 | Lu | G06F 3/0629 |
| 2018/0189508 A1* | 7/2018 | Li | G06F 21/52 |
| 2021/0303527 A1* | 9/2021 | Grunwald | G06F 16/1824 |
| 2022/0197924 A1* | 6/2022 | Chen | G06F 16/2343 |
| 2022/0289317 A1* | 9/2022 | Dieter | B62D 53/0885 |

OTHER PUBLICATIONS

European Office Action dated Feb. 22, 2022 issued in corresponding European Patent Application No. 21 197 563.6.

* cited by examiner

STORAGE DEVICE, STORAGE SYSTEM, AND METHOD OF OPERATING THE STORAGE SYSTEM

This application claims the benefit of Korean Patent Application No. 10-2020-0119822, filed on Sep. 17, 2020, in the Korean Intellectual Property Office, the disclosure of which is incorporated herein in its entirety by reference.

BACKGROUND

Inventive concepts relate to a storage device, a storage system, and/or a method of operating the storage system.

When a file system stores a file in a storage device, the file system stores file data and metadata in the storage device. The file data includes the contents of a file to be stored by a user application, and the metadata includes attributes of the file and the location of a block in which the file data is stored. In addition, when the file system reads a file from the storage device, the stored file data and metadata must be read from the storage device.

Meanwhile, the file system may support a checkpointing function to support sudden power-off of the storage device. Using the checkpointing function, the file system may quickly help guarantee or more quickly help safeguard consistency when power is applied again after sudden power-off.

SUMMARY

Some example embodiments provide a storage device which performs checkpointing by remapping a flash mapping table.

Some example embodiments also provide a storage system which comprises a storage device performing checkpointing by remapping a flash mapping table and/or a method of operating the storage system.

However, example embodiments are not restricted to the one set forth herein. The above and other aspects of inventive concepts will become more apparent to one of ordinary skill in the art to which example embodiments pertains by referencing the detailed description of inventive concepts given below.

According to some example embodiments, a storage system includes a storage device comprising a nonvolatile memory, the nonvolatile memory configured to store data at physical addresses, the physical addresses including a first physical address and a second physical address, and a host comprising a host processing circuitry configured to (A) insert a first journal logical address and a first target logical address into a journal mapping table, to (B) generate a journaling command by arranging first journal data in a log page in sectors, the sectors addressed to the first target logical address, and to (C) generate a checkpointing command comprising the first target logical address and the first journal logical address. The storage device includes a flash mapping table configured to store a first mapping state in which the first journal logical address maps to the first physical address, and the first target logical address maps to the second physical address, and a storage device processing circuitry configured to (D) write the first journal data arranged in sectors to an area of the nonvolatile memory, which is addressed to the first physical address corresponding to the first journal logical address according to the first mapping state, the writing in response to the journaling command, and to (E) change the first mapping state of the flash mapping table to a second mapping state, in which the first target logical address is remapped to the first physical address, the changing in response to the checkpointing command.

According to some example embodiments, a method of operating a storage system includes inserting a first journal logical address, a first target logical address, a second journal logical address, and a second target logical address into a journal mapping table in a host, generating a log page by arranging first journal data and second journal data in sectors, the sectors addressed to the first target logical address and the second target logical address, writing the first journal data included in the log page to an area of a nonvolatile memory which is addressed to a first physical address that is mapped to the first journal logical address according to a flash mapping table, writing the second journal data included in the log page to an area of the nonvolatile memory which is addressed to a second physical address that is mapped to the second journal logical address according to the flash mapping table, generating a checkpointing command which comprises the first target logical address, the first journal logical address, the second target logical address, and the second journal logical address, and in response to the checkpointing command, updating the flash mapping table by remapping the first physical address to the first target logical address and remapping the second physical address to the second target logical address.

According to some example embodiments, a storage device includes a nonvolatile memory configured to store data at physical addresses, the physical addresses including a first physical address and a second physical address, and a memory controller circuitry comprising a flash mapping table storing a first mapping state in which a first journal logical address is mapped to the first physical address, and a first target logical address is mapped to the second physical address. The nonvolatile memory is configured to receive a log page comprising first journal data and to write the first journal data to the first physical address which corresponds to the first journal logical address according to the first mapping state stored in the flash mapping table, and the memory controller circuitry is configured to receive a checkpointing command comprising the first journal logical address and the first target logical address and to change the first mapping state of the flash mapping table to a second mapping table in which the first target logical address is remapped to the first physical address, the changing being in response to the checkpointing command.

BRIEF DESCRIPTION OF THE DRAWINGS

These and/or other aspects will become apparent and more readily appreciated from the following description of some example embodiments, taken in conjunction with the accompanying drawings in which.

DETAILED DESCRIPTION OF SOME
EXAMPLE EMBODIMENTS

Figure 1:
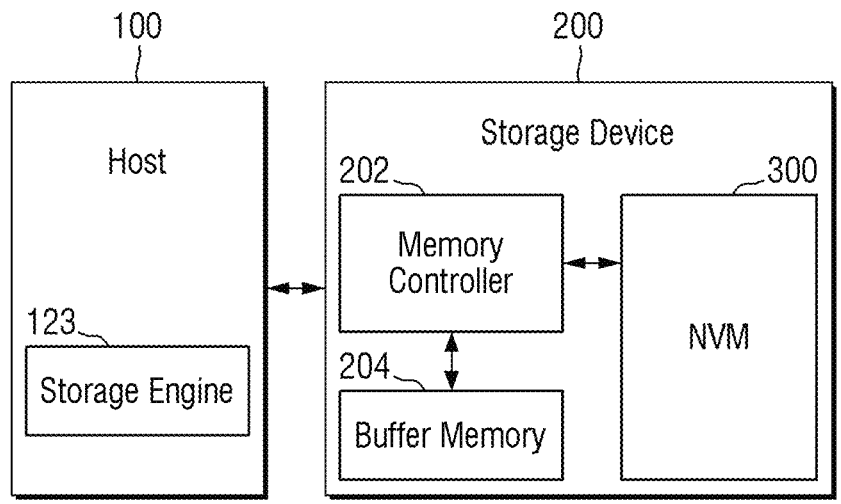
FIG. 1 is a block diagram of a storage system according to some example embodiments.

FIG. 1 is a block diagram of a storage system according to some example embodiments.

Referring to FIG. 1, the storage system according to some example embodiments may include a host 100 and a storage device 200.

The host 100 may include a storage engine 123. The storage engine 123 may generate a command according to a query for reading data from the storage device 200 and/or writing data to the storage device 200. The host 100 may provide the command to the storage device 200.

The storage device 200 may include a memory controller 202, a buffer memory 204, and a nonvolatile memory 300.

The storage device 200 may include storage media for storing data according a request from the host 100. The storage device 200 may include, for example, at least one of a solid state drive (SSD), an embedded memory, and a removable external memory. When the storage device 200 is or includes an SSD, the storage device 200 may be or include a device that conforms to a nonvolatile memory express (NVMe) standard. When the storage device 200 is or includes an embedded memory or an external memory, the storage device 200 may be a device that conforms to a universal flash storage (UFS) or embedded multimedia card (eMMC) standard. Each of the host 100 and the storage device 200 may generate and/or transmit a packet according to an employed standard protocol.

The memory controller 202 may be connected, e.g. connected by wires and/or wirelessly connected, to the host 100 and the nonvolatile memory 300. The memory controller 202 may be configured to access the nonvolatile memory 300 in response to the command of the host 100.

The buffer memory 204 may temporarily store data to be recorded in the nonvolatile memory 300 or data read from the nonvolatile memory 300. The buffer memory 204 may be provided outside the memory controller 202 and/or be provided in the memory controller 202. The buffer memory 204 may be or include a volatile memory serving as a buffer, but may also be or include a nonvolatile memory.

The nonvolatile memory 300 may be or include, for example, a flash memory. The flash memory may include a 2D NAND memory array and/or a 3D (or vertical) NAND (VNAND) memory array. Alternatively or additionally, the storage device 200 may include various other types of nonvolatile memories. For example, the storage device 200 may include at least one of a magnetic RAM (MRAM), a spin-transfer torque MRAM, a conductive bridging RAM (CBRAM), a ferroelectric RAM (FeRAM), a phase RAM (PRAM), a resistive RAM, and various other types of memories.

Figure 2:
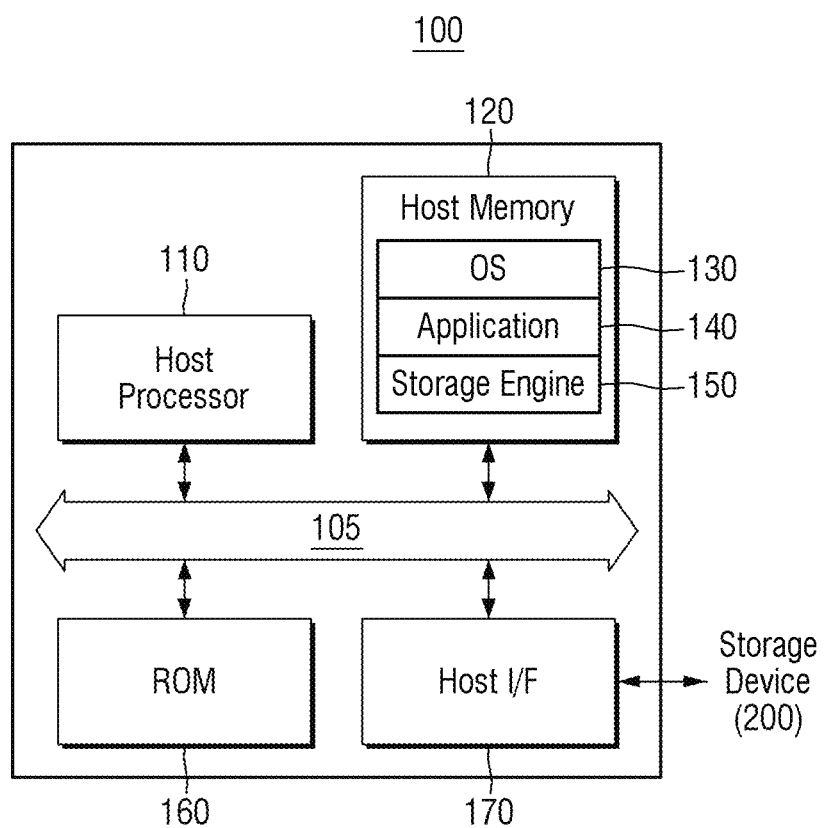
FIG. 2 is a block diagram of a host of FIG. 1.

FIG. 2 is a block diagram of the host 100 of FIG. 1.

Referring to FIG. 2, the host 100 may include a host processor 110, a host memory 120, a ROM 160, and a host interface 170. The host processor 110, the host memory 120, and the ROM 160 may be electrically connected to each other through a bus 105.

The host processor 110 may control the overall operation of the host 100. The host processor 110 may drive an operating system (OS) 130, an application 140 and a storage engine 150 for driving the host 100.

The host memory 120 may be used as a driving memory for driving software or firmware. Application programs and/or data to be processed by the host processor 110 may be loaded into the host memory 120. For example, the host memory 120 may be loaded with the OS 130, the application 140, and the storage engine 150.

The ROM 160 may store code data required for or used during initial booting.

The host interface 170 may provide an interface between the host 100 and the storage device 200. For example, the host 100 and the storage device 200 may be connected through at least one of various standardized interfaces. The standardized interfaces may include various interfaces such as at least one of advanced technology attachment (ATA), serial ATA (SATA), external SATA (e-SATA), small computer system interface (SCSI), serial attached SCSI (SAS), peripheral component interconnection (PCI), PCI express (PCI-E), universal serial bus (USB), IEEE 1394, and a card interface.

Figure 3:
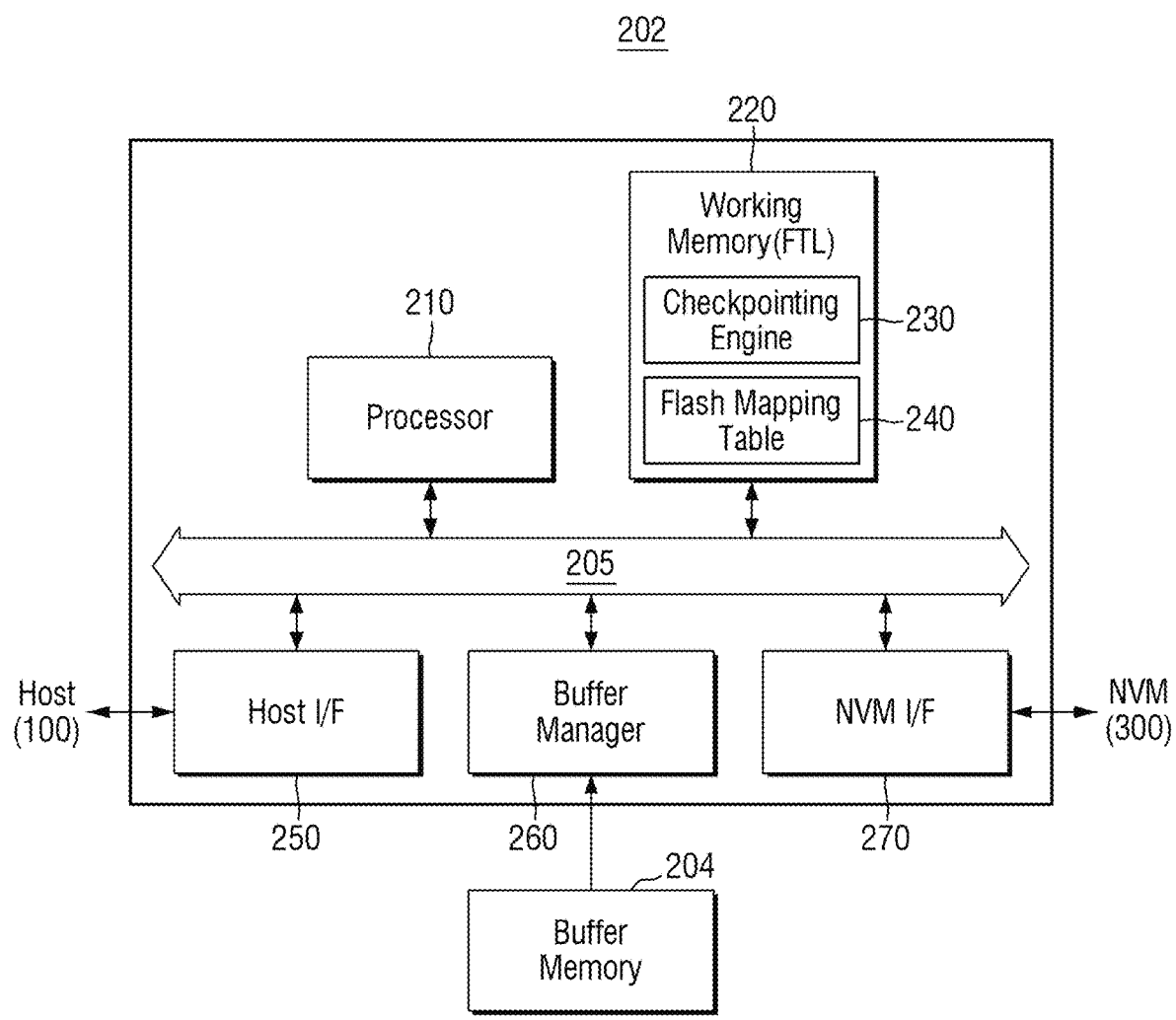
FIG. 3 is a block diagram of a memory controller of FIG. 1.

FIG. 3 is a block diagram of the memory controller 202 of FIG. 1.

Referring to FIG. 3, the memory controller 202 may include at least one processor 210, a working memory 220, a host interface 250, a buffer manager 260, and a nonvolatile memory interface 270. The at least one processor 210, the working memory 220, and the buffer manager 260 may be electrically connected to each other through a bus 205.

The processor 210 may include at least one of a central processing unit (CPU), a controller, or an application specific integrated circuit (ASIC). The processor 210 may control the overall operation of the memory controller 202. The processor 210 may control the memory controller 202 by driving firmware loaded into the working memory 220.

The working memory 220 may be loaded with software and/or firmware for controlling the memory controller 202. For example, a flash translation layer (FTL) may be loaded into and driven in the working memory 220. The working memory 220 may be implemented as at least one of a cache memory, a DRAM, an SRAM, or a flash memory.

The FTL may perform various functions such as at least one of address mapping, wear-leveling, and garbage collection.

The address mapping operation is or includes an operation of converting a logical address received from the host 100 into a physical address used to actually or physically store data in the nonvolatile memory 300. The FTL may convert a logical address into a physical address using a flash mapping table 240 in the working memory 220 and may provide the physical address to the nonvolatile memory 300.

The wear-leveling is or includes a technology for preventing or reducing the amount of excessive deterioration of a specific block by allowing blocks in the nonvolatile memory 300 to be used uniformly, and may be implemented through, e.g., a firmware technology that balances erase counts of physical blocks. The garbage collection is or includes a technology for securing usable capacity in the nonvolatile memory 300 by copying valid data of a block to a new block and then erasing the existing block.

A storage device checkpointing engine 230 may write journal data received from the host 100 to the nonvolatile memory 300. The checkpointing engine 230 may perform a checkpointing operation in response to a checkpoint command received from the host 100. The storage device checkpointing engine 230 may perform the checkpointing operation by updating the flash mapping table 240. This will be described in detail below with reference to FIGS. 12 through 17. Although the storage device checkpointing engine 230 is illustrated as being a component of the working memory 220, example embodiments are not limited thereto. For example, functions performed by the storage device checkpointing engine 230 may be performed by other components within the memory controller 202 or other components within the storage device 200.

The host interface 250 may transmit and receive packets to and from the host 100. A packet transmitted from the host 100 to the host interface 250 may include a command or data to be recorded in the nonvolatile memory 300. A packet transmitted from the host interface 250 to the host 100 may include a response to a command or data read from the nonvolatile memory 300. The host interface 250 may provide an interface between the host 100 and the memory controller 202. For example, the host 100 and the memory controller 202 may be connected through at least one of various standardized interfaces. The standardized interfaces may include various interfaces such as the host interface 170 described above in FIG. 2.

The buffer manager 260 may provide an interface between the memory controller 202 and the buffer memory 204. Data to be recorded in the nonvolatile memory 300 and/or data read from the nonvolatile memory 300 may be temporarily stored in the buffer memory 204 through the buffer manager 260. Although the buffer manager 260 is illustrated as being separate from other components of the memory controller 202, example embodiments are not limited thereto. For example, functions performed by the buffer manager 260 may be performed by other components within the memory controller 202 and/or other components within the storage device 200.

The nonvolatile memory interface 270 may transmit data to be recorded in the nonvolatile memory 300 to the nonvolatile memory 300 and/or may receive data read from the nonvolatile memory 300. The nonvolatile memory interface 270 may be implemented to comply with a standard protocol such as Toggle and/or ONFI.

Figure 4:
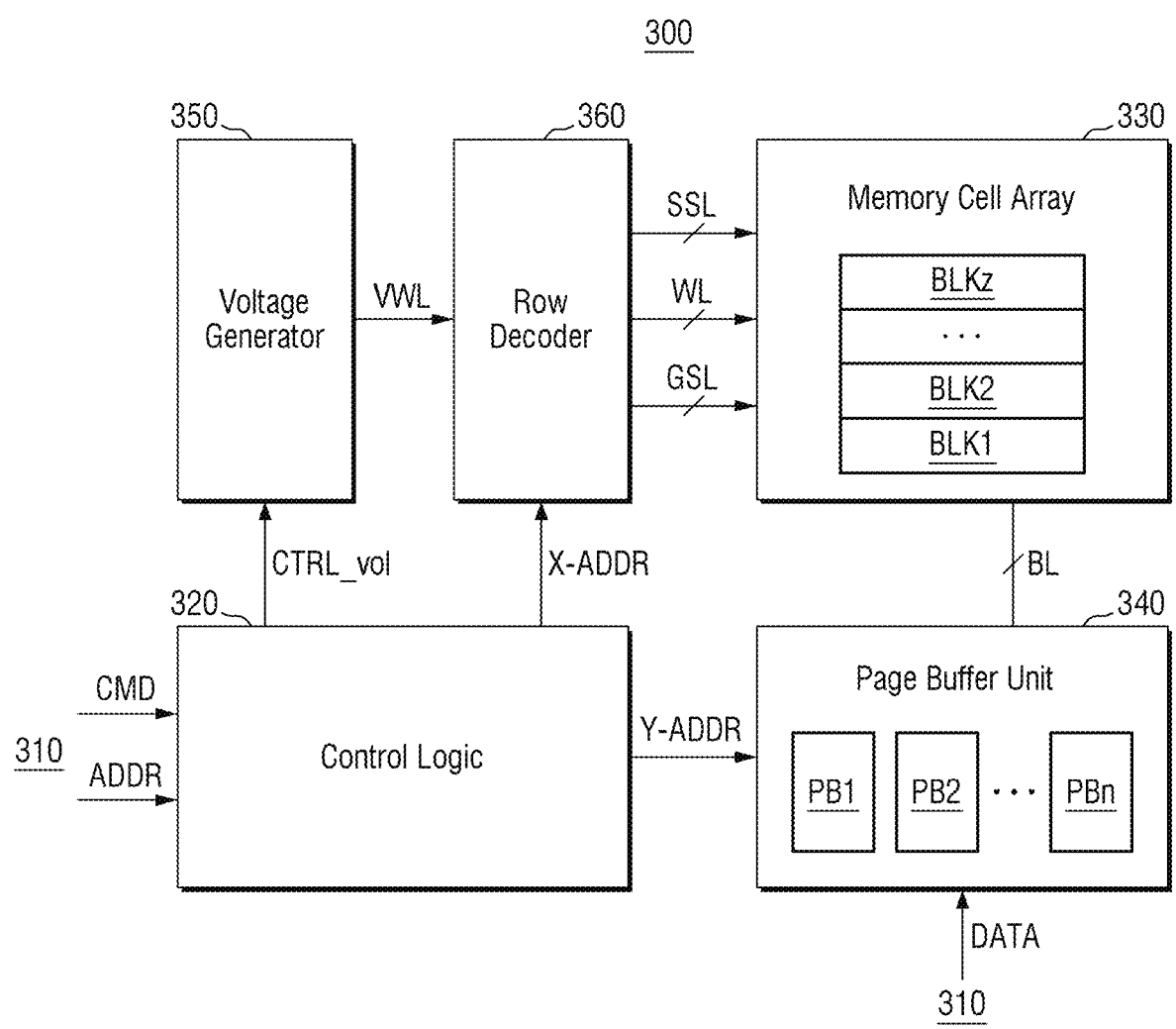
FIG. 4 is a block diagram of a nonvolatile memory of FIG. 1.

FIG. 4 is a block diagram of the nonvolatile memory 300 of FIG. 1. Referring to FIG. 4, the nonvolatile memory 300 may include a control logic circuit 320, a memory cell array 330, a pager buffer unit 340, a voltage generator 350, and a row decoder 360. Although not illustrated in FIG. 4, the nonvolatile memory 300 may further include a memory interface circuit 310 and may further include at least one of a column logic, a pre-decoder, a temperature sensor, a command decoder, an address decoder, and the like.

The control logic circuit 320 may generally control various operations in the nonvolatile memory 300. The control logic circuit 320 may output various control signals in response to a command CMD and/or an address ADDR from the memory interface circuit 310. For example, the control logic circuit 320 may output a voltage control signal CTRL_vol, a row address X-ADDR, and a column address Y-ADDR.

The memory cell array 330 may include a plurality of memory blocks BLK1 through BLKz (where z is a positive integer), and each of the memory blocks BLK1 through BLKz may include a plurality of memory cells. Each of the plurality of memory cells may store at least one bit. The memory cell array 330 may be connected to the page buffer unit 340 through bit lines BL and may be connected to the row decoder 360 through word lines WL, string select lines SSL and ground select lines GSL.

In some example embodiments, the memory cell array 330 may include a 3D memory cell array, and the 3D memory cell array may include a plurality of NAND strings. Each of the NAND strings may include memory cells respectively connected to word lines stacked vertically on a substrate. U.S. Pat. Nos. 7,679,133, 8,553,466, 8,654,587, 8,559,235, and U.S. Patent Application Publication No. 2011/0233648 are incorporated herein by reference. Alternatively or additionally, in some example embodiments, the memory cell array 330 may include a 2D memory cell array, and the 2D memory cell array may include a plurality of NAND strings disposed along row and column directions.

The page buffer unit 340 may include a plurality of page buffers PB1 through PBn (where n is an integer of 3 or more), and the page buffers PB1 through PBn may be connected to the memory cells through the bit lines BL, respectively. The page buffer unit 340 may select at least one of the bit lines BL in response to the column address Y-ADDR. The page buffer unit 340 may operate as a program or write driver and/or a sense amplifier according to an operating mode. For example, during a write/program operation, the page buffer unit 340 may apply a bit line voltage corresponding to data to be programmed to a selected bit line. During a read operation, the page buffer unit 340 may sense data stored in a memory cell by sensing a current or voltage of a selected bit line. Although the page buffer unit 340 is illustrated as being separate from the nonvolatile memory 300, example embodiments are not limited thereto. For example, functions performed by the page buffer unit 340 may be performed by other components within the nonvolatile memory 300, or may be performed by components separate from the nonvolatile memory 300.

The voltage generator 350 may generate various types of voltages such as various types of DC voltages for performing program, read, and erase operations based on the voltage control signal CTRL_vol. For example, the voltage generator 350 may generate at least one of a program voltage, a read voltage, a program verify voltage, an erase voltage, or the like as a word line voltage VWL.

The row decoder 360 may select one of the word lines WL in response to the row address X-ADDR, and may select one of the string select lines SSL. For example, the row decoder 360 may apply a program voltage and a program verify voltage to a selected word line during a program operation and may apply a read voltage to a selected word line during a read operation.

Figure 5:
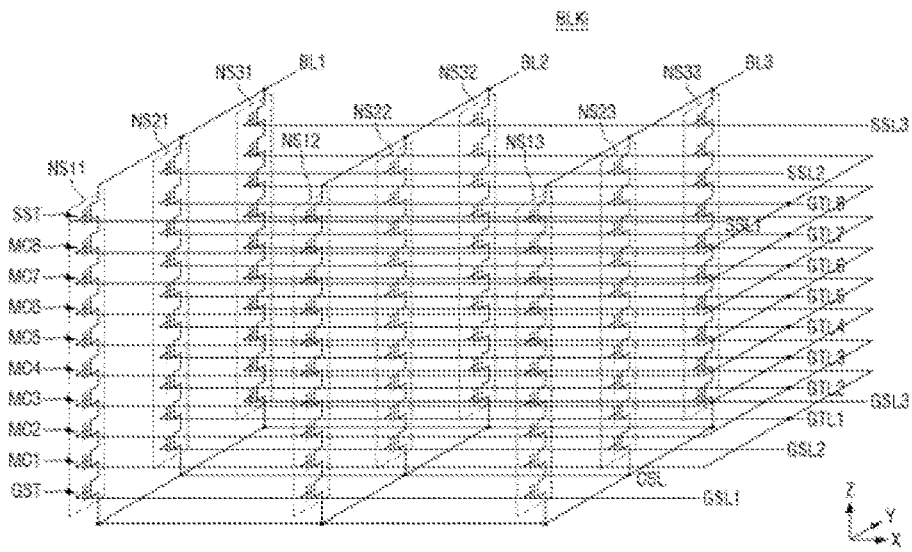
FIG. 5 illustrates a 3D V-NAND structure applicable to the nonvolatile memory of FIG. 1.

FIG. 5 illustrates a 3D V-NAND structure applicable to the nonvolatile memory 300 of FIG. 1. When the nonvolatile memory 300 of FIG. 1 is implemented as a 3D V-NAND type flash memory, each of the memory blocks BLK1 through BLKz constituting/included in the memory cell array 330 of the nonvolatile memory 300 can be expressed as an equivalent circuit as illustrated in FIG. 5.

A memory block BLKi illustrated in FIG. 5 is or includes a 3D memory block formed in a 3D structure on a substrate. For example, a plurality of memory NAND strings included in the memory block BLKi may be formed in a direction perpendicular to a surface of the substrate.

Referring to FIG. 5, the memory block BLKi may include a plurality of memory NAND strings NS11 through NS33 connected between bit lines BL1 through BL3 and a common source line CSL. Each of the memory NAND strings NS11 through NS33 may include a string select transistor SST, a plurality of memory cells MCI through MC8, and a ground select transistor GST. Although each of the memory NAND strings NS11 through NS33 includes eight memory cells MC1 through MC8 in FIG. 8, inventive concepts are not limited thereto.

The string select transistor SST may be connected to a corresponding string select line SSL1, SSL2 or SSL3. The memory cells MC1 through MC8 may be connected to corresponding gate lines GTL1 through GTL8, respectively. The gate lines GTL1 through GTL8 may be or correspond to word lines, and some of the gate lines GTL1 through GTL8 may be or correspond to dummy word lines (e.g., to dummy word lines that are not electrically active during operation of the nonvolatile memory 300). The ground select transistor GST may be connected to a corresponding ground select line GSL1, GSL2 or GSL3. The string select transistor SST may be connected to a corresponding bit line BL1, BL2 or BL3, and the ground select transistor GST may be connected to the common source line CSL.

Word lines (e.g., WL1) at the same level may be connected in common, and the ground select lines GSL1 through GSL3 and the string select lines SSL1 through SL3 may be separated from each other. Although the memory block BLKi is connected to eight gate lines GTL1 through GTL8 and three bit lines BL1 through BL3 in FIG. 5, inventive concepts is not limited thereto.

Figure 6:
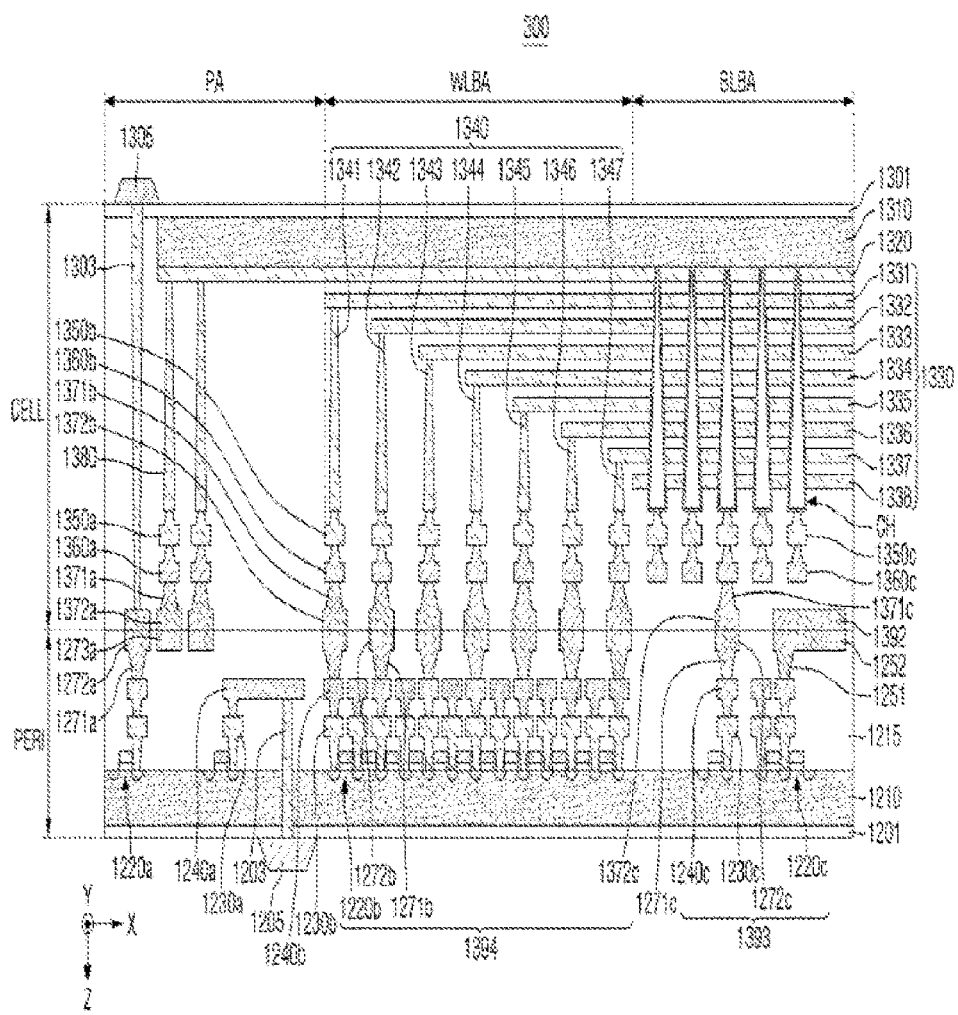
FIG. 6 illustrates a BVNAND structure applicable to the nonvolatile memory of FIG. 1.

FIG. 6 illustrates a BVNAND structure applicable to the nonvolatile memory 300 of FIG. 1. Referring to FIG. 6, the nonvolatile memory 300 may have a chip-to-chip (C2C) structure. The C2C structure may be formed by manufacturing (or fabricating) an upper chip including a cell area CELL on a first wafer, manufacturing (or fabricating) a lower chip including a peripheral circuit area PERI on a second wafer different from the first wafer, and then connecting the upper chip and the lower chip using a bonding method such as a wafer-bonding method. For example, the bonding method may refer to a method of electrically connecting a bonding metal formed on an uppermost metal layer of the upper chip and a bonding metal formed on an uppermost metal layer of the lower chip. For example, when the bonding metals are made of or include copper (Cu), the bonding method may be a Cu—Cu bonding method. The bonding metals may also be made of or include aluminum and/or tungsten.

Each of the periphery circuit area PERI and the cell area CELL of the nonvolatile memory 300 according to some example embodiments may include an external pad bonding area PA, a word line bonding area WLBA, and a bit line bonding area BLBA.

The peripheral circuit area PERI may include a first substrate 1210, an interlayer insulating layer 1215, a plurality of circuit elements 1220a through 1220c formed on the first substrate 1210, first metal layers 1230a through 1230c respectively connected to the circuit elements 1220a through 1220c, and second metal layers 1240a through 1240c formed on the first metal layers 1230a through 1230c. In some example embodiments, the first metal layers 1230a through 1230c may be made of or include tungsten having a relatively high resistance, and the second metal layers 1240a through 1240c may be made of or include copper having a relatively low resistance.

Although only the first metal layers 1230a through 1230c and the second metal layers 1240a through 1240c are illustrated and described herein, inventive concepts are not limited thereto. One or more metal layers may also be further formed on the second metal layers 1240a through 1240c. At least some of one or more memory layers formed on the second metal layers 1240a through 1240c may be made of or include aluminum having a lower resistance than copper that forms the second metal layers 1240a through 1240c.

The interlayer insulating layer 1215 may be disposed on the first substrate 1210 to cover the circuit elements 1220a through 1220c, the first metal layers 1230a through 1230c and the second metal layers 1240a through 1240c and may include an insulating material such as silicon oxide or silicon nitride.

Lower bonding metals 1271b and 1272b may be formed on the second metal layers 1240b of the word line bonding area WLBA. In the word line bonding area WLBA, the lower bonding metals 1271b and 1272b of the peripheral circuit area PERI may be electrically connected to upper bonding metals 1371b and 1372b of the cell area CELL by a bonding method, and the lower bonding metals 1271b and 1272b and the upper bonding metals 1371b and 1372b may be made of aluminum, copper or tungsten.

The cell area CELL may provide at least one memory block. The cell area CELL may include a second substrate 1310 and a common source line 1320 (corresponding to CSL of FIG. 5). A plurality of word lines 1331 through 1338 (1330, corresponding to GTL1 through GTL8 of FIG. 5) may be stacked on the second substrate 1310 along a third direction z perpendicular to an upper surface of the second substrate 1310. String select lines and a ground select line may be disposed on and under the word lines 1330, and the word lines 1330 may be disposed between the string select lines and the ground select line.

In the bit line bonding area BLBA, channel structures CH may extend in the direction perpendicular to the upper surface of the second substrate 1310 to penetrate the word lines 1330, the string select lines, and the ground select line. Each of the channel structures CH may include a data storage layer, a channel layer and a buried insulating layer, and the channel layer may be electrically connected to a first metal layer 1350c and a second metal layer 1360c. For example, the first metal layer 1350c may be or correspond to or include a bit line contact, and the second metal layer 1360c may be a bit line or correspond to or include (corresponding to BL1 through BL3 of FIG. 5). In some example embodiments, the bit line 1360c may extend along a second direction y parallel to the upper surface of the second substrate 1310.

In some example embodiments illustrated in FIG. 6, an area where the channel structures CH and the bit lines 1360c are disposed may be defined as the bit line bonding area BLBA. In the bit line bonding area BLBA, the bit line 1360c may be electrically connected to the circuit elements 1220c, which provide a page buffer 1393 in the peripheral circuit area PERI. For example, the bit line 1360c may be connected to upper bonding metals 1371c and 1372c in the cell area CELL, and the upper bonding metals 1371c and 1372c may be connected to lower bonding metals 1271c and 1272c connected to the circuit elements 1220c of the page buffer 1393.

In the word line bonding area WLBA, the word lines 1330 may extend along a first direction x parallel to the upper surface of the second substrate 1310 and may be connected to a plurality of cell contact plugs 1341 through 1347 (1340). The word lines 1330 and the cell contact plugs 1340 may be connected to each other by pads provided by at least some of the word lines 1330, which extend to different lengths along the first direction x. First metal layers 1350b and second metal layers 1360b may be sequentially connected to the cell contact plugs 1340 connected to the word lines 1330. In the word line bonding area WLBA, the cell contact plugs 1340 may be connected to the peripheral circuit area PERI through the upper bonding metals 1371b and 1372b of the cell area CELL and the lower bonding metals 1271b and 1272b of the peripheral circuit area PERI.

The cell contact plugs 1340 may be electrically connected to the circuit elements 1220b which provide a row decoder 1394 in the peripheral circuit area PERI. In some example embodiments, an operating voltage (e.g. a DC operating voltage) of the circuit elements 1220b which provide the row decoder 1394 may be different from an operating voltage (e.g. a DC operating voltage) of the circuit elements 1220c which provide the page buffer 1393. For example, the operating voltage of the circuit elements 1220c which provide the page buffer 1393 may be greater than, or greater in magnitude than, the operating voltage of the circuit elements 1220b which provide the row decoder 1394.

Common source line contact plugs 1380 may be disposed in the external pad bonding area PA. The common source line contact plugs 1380 may be made of or include a conductive material such as a metal, a metal compound or polysilicon such as doped polysilicon and may be electrically connected to the common source line 1320. First metal layers 1350a and second metal layers 1360a may be sequentially stacked on the common source line contact plugs 1380. For example, an area where the common source line contact plugs 1380, the first metal layers 1350a, and the second metal layers 1360a are disposed may be defined as the external pad bonding area PA.

Input/output pads 1205 and 1305 may be disposed in the external pad bonding area PA. A lower insulating layer 1201 may be formed under the first substrate 1210 to cover a lower surface of the first substrate 1210, and a first input/output pad 1205 may be formed on the lower insulating layer 1201. The first input/output pad 1205 may be connected to at least one of the circuit elements 1220a through 1220c disposed in the peripheral circuit area PERI through a first input/output contact plug 1203, and may be separated from the first substrate 1210 by the lower insulating layer 1201. Alternatively or additionally, a side insulating layer may be disposed between the first input/output contact plug 1203 and the first substrate 1210 to electrically separate the first input/output contact plug 1203 and the first substrate 1210.

An upper insulating layer 1301 may be formed on the second substrate 1310 to cover the upper surface of the second substrate 1310, and a second input/output pad 1305 may be disposed on the upper insulating layer 1301. The second input/output pad 1305 may be connected to at least one of the circuit elements 1220a through 1220c disposed in the peripheral circuit area PERI through a second input/output contact plug 1303.

According some example embodiments, the second substrate 1310 and the common source line 1320 may not be disposed in an area where the second input/output contact plug 1303 is disposed. Alternatively or additionally the second input/output pad 1305 may not overlap the word lines 1330 in the third direction z. Referring to FIG. 6, the second input/output contact plug 1303 may be separated from the second substrate 1310 in a direction parallel to the upper surface of the second substrate 1310 and may be connected to the second input/output pad 1305 by penetrating an interlayer insulating layer 1215 of the cell area CELL.

According some example embodiments, the first input/output pad 1205 and the second input/output pad 1305 may be selectively formed. For example, the nonvolatile memory 300 according to some example embodiments may include only the first input/output pad 1205 disposed on the first substrate 1210 or may include only the second input/output pad 1305 disposed on the second substrate 1310. Alternatively or additionally, the nonvolatile memory 300 may include both the first input/output pad 1205 and the second input/output pad 1305.

In each of the external pad bonding area PA and the bit line bonding area BLBA included in each of the cell area CELL and the peripheral circuit area PERI, a metal pattern of an uppermost metal layer may exist as a dummy pattern, or the upper metal layer may be empty.

In the external pad bonding area PA of the nonvolatile memory 300 according to some example embodiments, lower metal patterns 1272a and 1273a having the same shape as upper metal patterns 1372a of the cell area CELL may be formed in an uppermost metal layer of the peripheral circuit area PERI to correspond to the upper metal patterns 1372a formed in an uppermost metal layer of the cell area CELL. The lower metal patterns 1272a and 1273a formed in the uppermost metal layer of the peripheral circuit area PERI may not be connected to separate contacts in the peripheral circuit area PERI. Similarly, in the external pad bonding area PA, upper metal patterns having the same shape as lower metal patterns of the peripheral circuit area PERI may be formed in the uppermost metal layer of the cell area CELL to correspond to the lower metal patterns formed in the uppermost metal layer of the peripheral circuit area PERI.

The lower bonding metals 1271b and 1272b may be formed on the second metal layers 1240b of the word line bonding area WLBA. In the word line bonding area WLBA, the lower bonding metals 1271b and 1272b of the peripheral circuit area PERI may be electrically connected to the upper bonding metals 1371b and 1372b of the cell area CELL by a bonding method.

Alternatively or additionally, in the bit line bonding area BLBA, an upper metal pattern 1392 having the same shape as a lower metal pattern 1251 and 1252 of the peripheral circuit area PERI may be formed in the uppermost metal layer of the cell area CELL to correspond to the lower metal pattern 1251 and 1252 formed in the uppermost metal layer of the peripheral circuit area PERI. A contact may not be formed on the upper metal pattern 1392 formed in the uppermost metal layer of the cell area CELL.

FIGS. 7 through 10 are diagrams for explaining the storage system according to some example embodiments.

Figure 7:
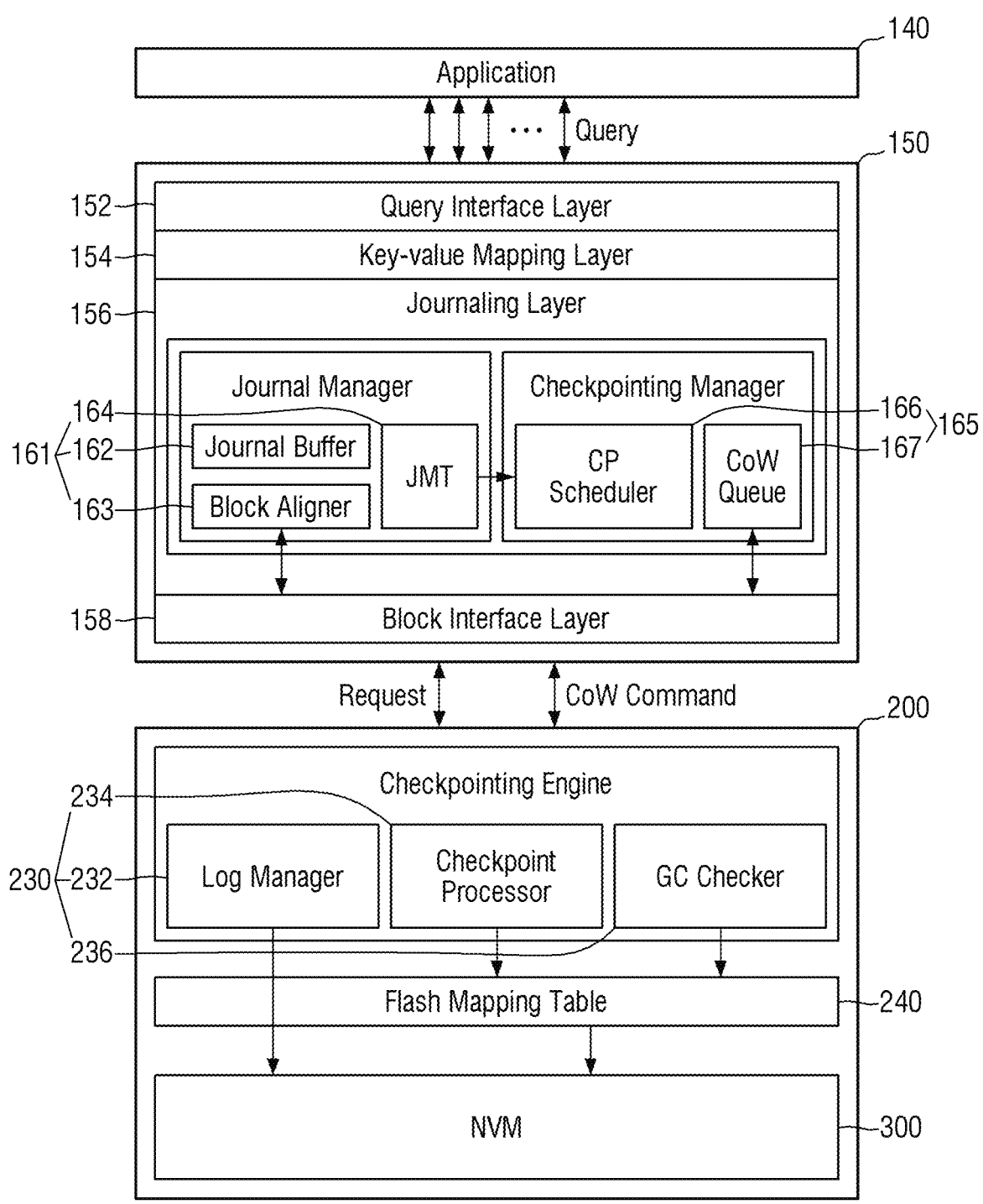
FIGS. 7 through 10 are diagrams for explaining the storage system according to some example embodiments.

Referring to FIG. 7, in some example embodiments, the application 140 may provide a query to the storage engine 150 within the host 100. The query may be or include, for example, a put query including data to be written into the storage device 200 and a logical address and/or a get query including a logical address to be read from the storage device 200. The application 140 may be or include, for example, a key-value store database (DB). The key-value store DB may be, for example, at least one of a Rocks DB, a Level DB, or a Mongo DB.

The storage engine 150 within the host 100 may include a query interface layer 152, a key-value mapping layer 154, a journaling layer 156, and a block interface layer 158. The query interface layer 152 may receive a query from the application 140. When the application 140 is a key-value store, the storage engine 150 may receive a query including a key-value pair from the application 140, instead of data and a logical address. The key-mapping layer 154 may convert a key-value pair into a logical address and a value. Although FIG. 7 illustrates that each of the components of the storage engine 150 within the host 100 are separate, example embodiments are not limited thereto. For example, some functions of the query interface layer 152, the key-value mapping layer 154, the journaling layer 156, and the block interface layer 158 that are described herein may be performed by others of the query interface layer 152, the key-value mapping layer 154, the journaling layer 156, and the block interface layer 158.

The journaling layer 156 may include a journal manager 161 and a host checkpointing manager 165. When receiving a query from the application 140, the journal manager 161 may write a pair of a target logical address and a journal logical address included in the query to a journal mapping table 164. The journal manager 161 may temporarily store journal data included in a query in a journal buffer 162. When queries provided from the application 140 gather to generate a transaction, a block aligner 163 may generate a journaling command Request. The transaction may be or include a unit of work in which the journal manager 161 can simultaneously perform a plurality of queries. Although as described herein the journal manager 161 performs different functions from that of the host checkpointing manager 165, example embodiments are not limited thereto. For example, some of the functions described as being performed by the journal manager 161 may be performed by other processing circuitry such as the host checkpointing manager 165, and vice-versa. A host processing circuitry may perform the actions of both the host checkpointing manager 165 and the journal manager 161.

Figure 8:
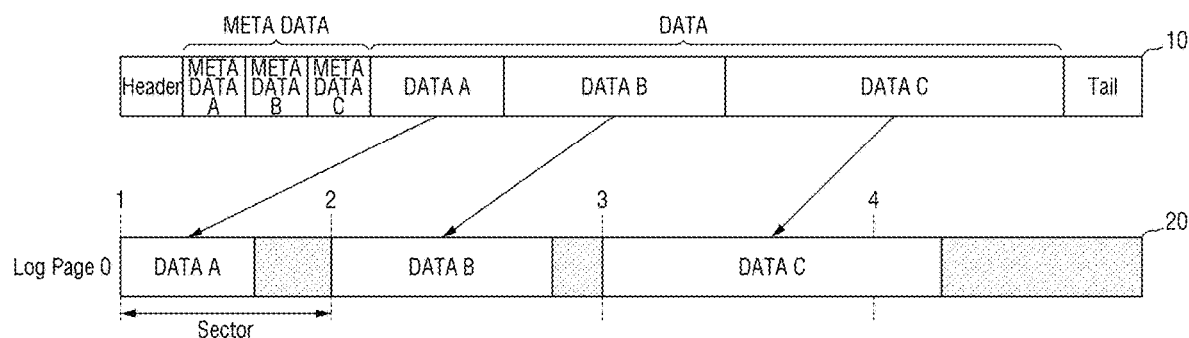

Referring to FIG. 8, a transaction 10 may include, e.g. may consist of, a header, metadata, data, and a tail. The header may indicate a start point of the transaction 10, and the tail may indicate an end point of the transaction 10. The metadata may include attributes of journal data DATA and a logical address at which the journal data DATA is stored. The journal manager 161 may arrange journal data DATA included in the transaction 10 in a log page Log Page 0 in units of sectors, e.g. of sectors having a fixed length. The journal manger 161 may generate the journaling command Request including the log page Log Page 0. For example, when the size of each of first journal data DATA A and second journal data DATA B included in the transaction 10 is less than the size of each sector and the size of third journal data DATA C is greater than the size of each sector, the first journal data DATA A may be arranged at a start point 1 of a first sector of the log page Log Page 0, the second journal data DATA B may be arranged at a start point 2 of a second sector of the log page, and the third journal data DATA C may be arranged at a start point 3 of a third sector of the log page.

Figure 9:
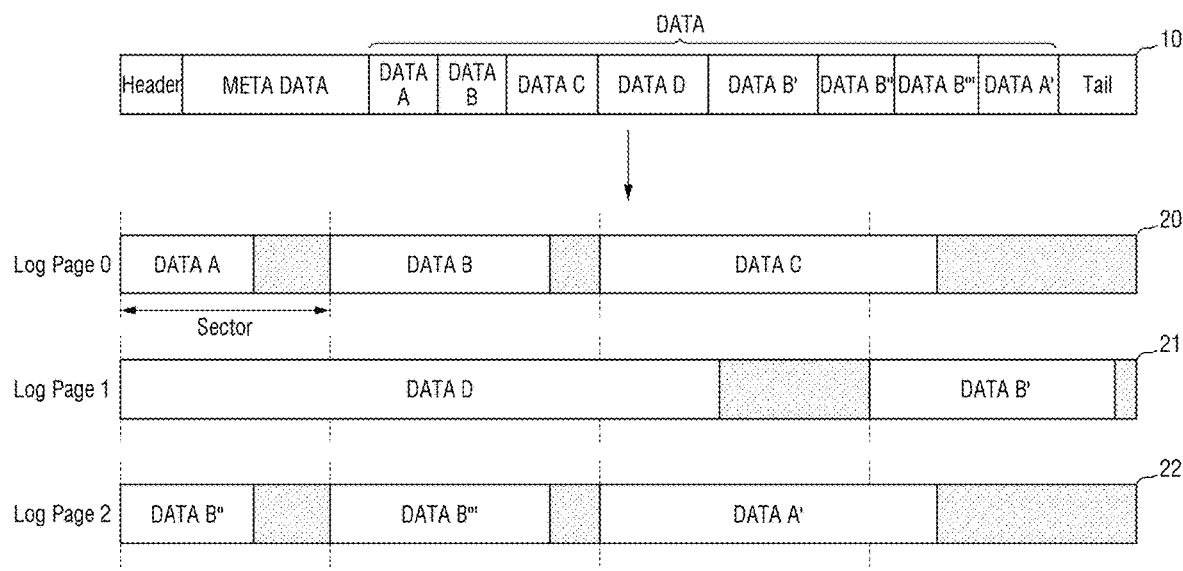

Referring to FIG. 9, the journal data DATA included in the transaction 10 may be arranged at a start point of each sector and may be arranged in a plurality of log pages Log Page 0 through Log Page 2 according to the size of the journal data DATA.

Figure 10:
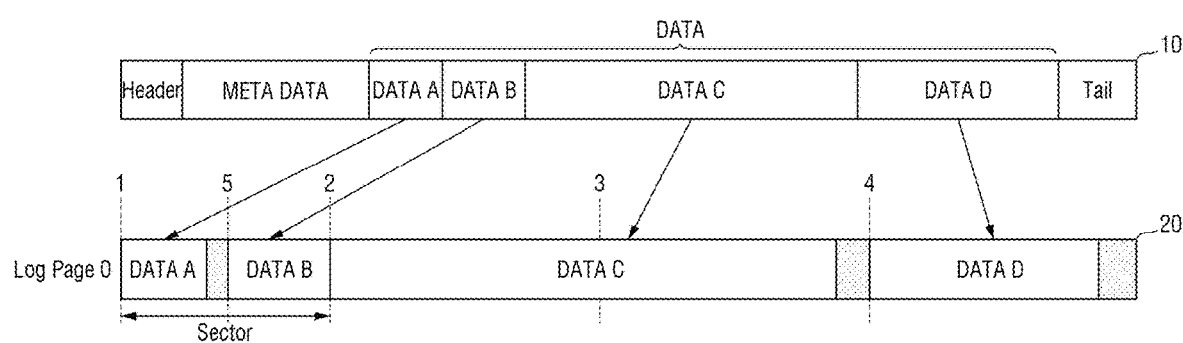

Referring to FIG. 10, the size of each of the first and second journal data DATA A and DATA B may be less than half the size of each sector. In this case, the first and second journal data DATA A and DATA B may be arranged in one sector. The first journal data DATA A may be arranged at the start point 1 of the first sector of the log page Log Page 0, and the second journal data DATA B may be arranged at a ½ point 5 of the first sector.

One sector may be divided into ¼, 2/4, ¾ and 4/4 points of the size of the sector, and the journal data DATA may be arranged at the ¼, 2/4, ¾, and 4/4 points in the sector according to the size of the journal data DATA. Accordingly, since the journal data DATA is arranged in the log page Log Page 0 in units of sectors, an amount of an empty area in which data are not arranged between the journal data DATA may be reduced, and performance of the storage device 200 may be improved.

For example, the storage device 200 according to some example embodiments may write data in units of pages, and the block aligner 163 may provide journal data in units of log pages. Therefore, write amplification of the storage device 200 can be improved. Alternatively or additionally, the size of data addressed to one logical address is a sector unit, and the flash mapping table 240 maps a physical address to a logical address. Therefore, since the block aligner 163 arranges journal data at a start point of a sector in a log page, the efficiency of remapping a logical address to a physical address in an area of a nonvolatile memory to which the journal data has been written can be increased. Alternatively or additionally, the written journal data can be reused as it is during journaling.

When the application 140 is a key-value store, e.g. an application for storing key-value pairs, the storage engine 150 may receive a query including a key-value pair. Since key-value pairs have various sizes, key-value pairs not usually arranged in units of sectors. In particular, when a small key-value pair is written to the storage device 200, since the storage device 200 is written in units of pages, the write amplification of the storage device 200 may be increased. Alternatively or additionally, frequent update of key-value pairs may increase generation of invalid pages in the storage device 200 and/or may increase the frequency of garbage collection.

However, in some example embodiments, key-value pairs are arranged in a log page in units of sectors and journaled accordingly. Therefore, the load of the storage device 200 can be reduced. Alternatively or additionally, since key-value pairs are arranged in units of sectors, e.g. of sectors having a fixed or constant size, a physical address indicating an area to which a key-value pair has been written in the nonvolatile memory 300 may be mapped to a target logical address by the flash mapping table 240. Therefore, journal data of the key-value pair can be reused during checkpointing.

Referring back to FIG. 7, the host checkpointing manager 165 may include a checkpoint scheduler 166 and a checkpointing command queue 167. The checkpoint scheduler 166 may generate a checkpointing command CoW Command by receiving a pair of a journal logical address and a target logical address from the journal mapping table 164. The checkpoint scheduler 166 may generate the checkpointing command CoW Command for each pair of the journal logical address and the target logical address, and the checkpointing command queue 167 may provide a plurality of checkpointing commands CoW Command as one set to the storage device 200. For example, when data cannot be written to the journal mapping table 164, the checkpoint scheduler 166 may generate the checkpointing command CoW Command according to a specific (or, alternatively, predetermined) cycle and/or when receiving a checkpointing query from the application 140. This will be described in detail below with reference to FIG. 15. Although as described herein the checkpoint scheduler 166 performs different functions from that of the checkpointing command queue 167, example embodiments are not limited thereto. For example, some of the functions described as being performed by the journal manager 161 may be performed by other processing circuitry such as the host checkpointing manager 165, and vice-versa.

Within the storage device 200, the storage device checkpointing engine 230 may include a log manager 232, a checkpoint processor 234, and a garbage collection checker 236. Although as described herein the log manager 232, the checkpoint processor 234, and the garbage collection checker 236 perform different functions, example embodiments are not limited thereto. For example, some of the functions described as being performed one of the components of the storage device checkpointing engine 230 may be performed by other components of the storage device checkpointing engine 230. A storage device processing circuitry may perform some or all of the actions described with reference to the log manager 232, the checkpoint processor 234, and the garbage collection checker 236 perform different functions.

The log manager 232 may perform journaling in response to the journaling command Request. The log manager 232 may write journal data to a physical address to which a journal logical address included in the journaling command Request has been mapped by the flash mapping table 240. Accordingly, journaling may be performed. When the journaling is finished/completed, the log manager 232 may inform the storage engine 150 that the journaling has been finished.

The checkpoint processor 234 may perform checkpointing in response to the checkpointing command CoW Command. The checkpoint processor 234 may remap the flash mapping table 240 using a journal logical address and a target logical address included in the checkpointing command CoW Command.

After the flash mapping table 240 is remapped, the garbage collection checker 236 may change a page of the nonvolatile memory 300, which is addressed to a physical address mapped to the journal logical address, to an invalid page (e.g. to indicate that the page is no longer valid). Accordingly, the checkpointing may be finished, and the storage device checkpointing engine 230 may inform the storage engine 150 that the checkpointing has been finished. The garbage collection checker 236 may perform garbage collection according to the number of valid pages and the number of invalid pages in the nonvolatile memory 300. This will be described in detail below with reference to FIGS. 11 through 16.

FIGS. 11 through 16 are block diagrams for explaining the operation of the storage device 200 according to some example embodiments.

Figure 11:
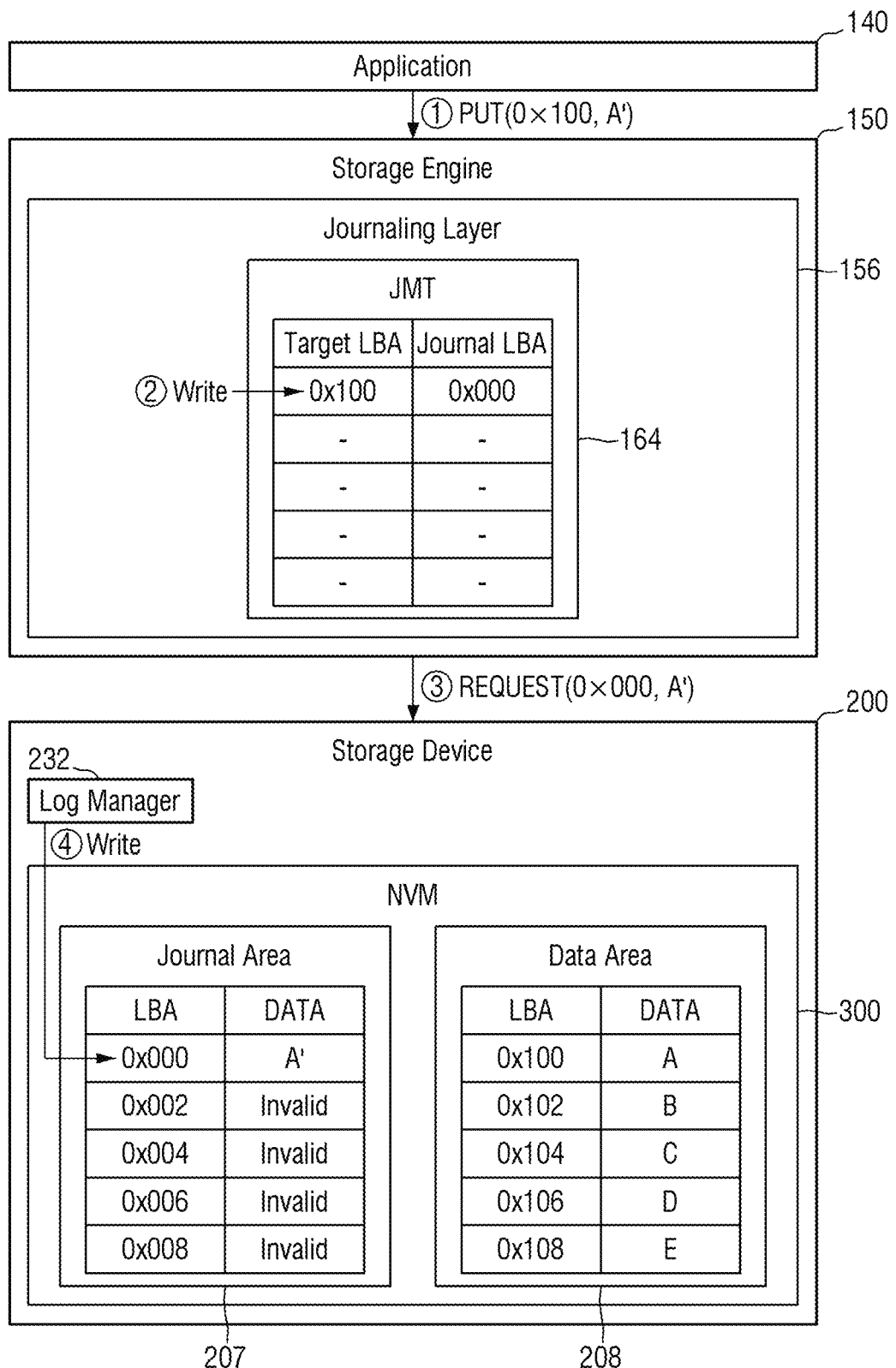
FIGS. 11 through 12 and 14 through 16 are block diagrams for explaining the operation of a storage device according to some example embodiments.

Referring to FIGS. 7 and 11, the application 140 may provide a query, e.g. a query such as PUT(0x100, A') including a target logical address 0x100 and journal data A' to the storage engine 150 (①). Data A, B, C, D and E are stored in an area 208 of the nonvolatile memory 300 which is addressed to physical addresses respectively mapped to logical addresses 0x100, 0x102, 0x104, 0x106 and 0x108 by the flash mapping table 240. The journal data A' indicates updated data of the data A stored in the area 208 of the nonvolatile memory 300, which is addressed to the physical address mapped to the target logical address 0x100 by the flash mapping table 240. In addition, the data A' is assumed to generate a transaction.

The journal manager 161 within the host 100 may write a pair of the target logical address 0x100 and a journal logical address 0x000 to the journal mapping table 164 (②). The block aligner 163 within the host 100 may generate a journaling command REQUEST(0x000, A') by arranging the journal data A' at a start point of a sector (③).

In response to the journaling command REQUEST (0x000, A'), the log manager 232 within the storage device 200 may write the journal data A' to an area 207 of the nonvolatile memory 300 which is addressed to a physical address mapped to the journal logical address 0x000 by the flash mapping table 240.

Figure 12:
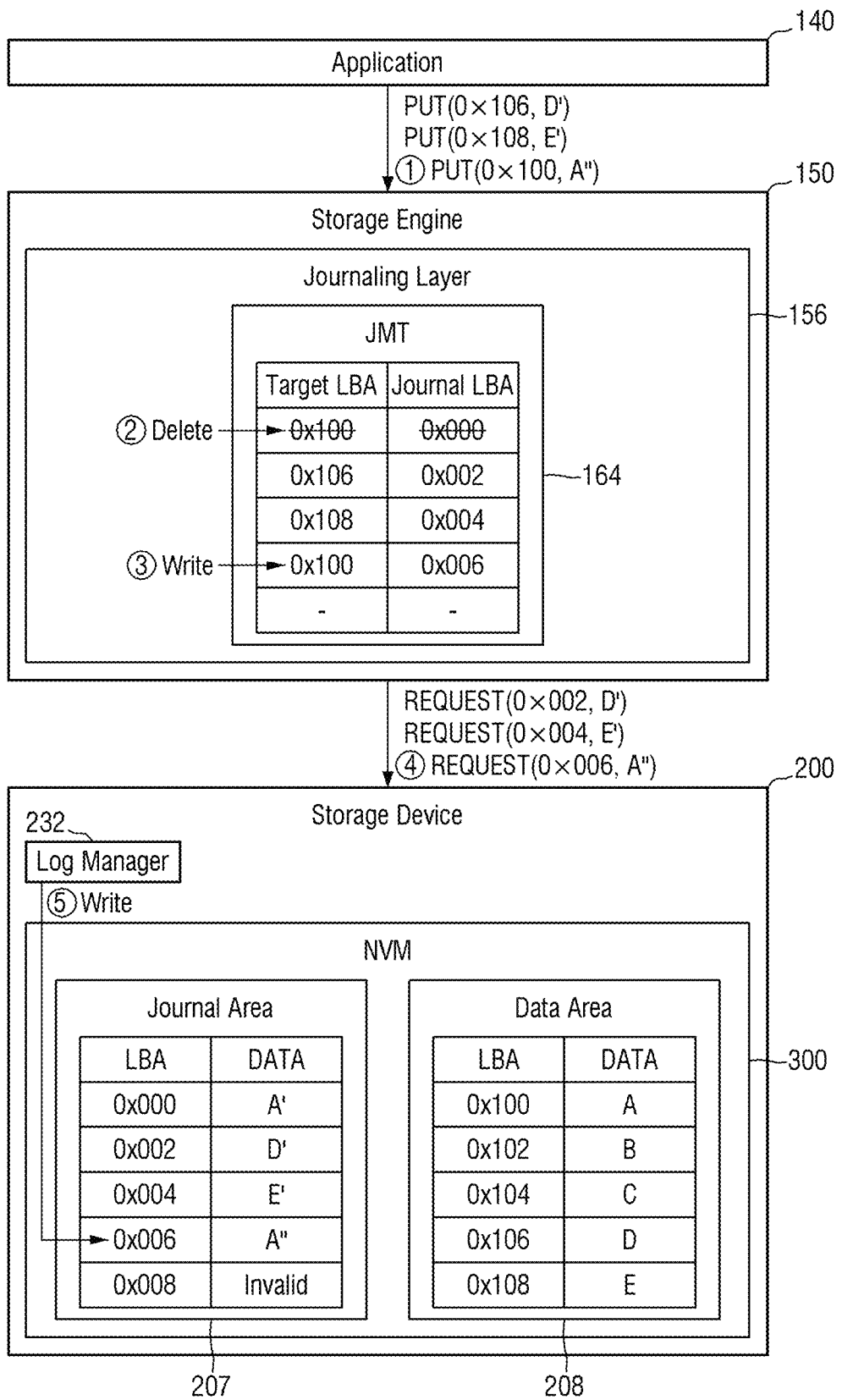

Referring now to FIGS. 7 and 12, the application 140 may provide a query PUT(0x106, D') including a target logical address 0x106 and journal data D' and a query PUT(0x108, E') including a target logical address 0x108 and journal data E' to the storage engine 150. Accordingly, as described above, a pair of the target logical address 0x106 and a journal logical address 0x002 and a pair of the target logical address 0x108 and a journal logical address 0x004 may be written to the journal mapping table 164, e.g. the journal mapping table 164 within the storage engine 150 of the host 100. The journal data D' may be written to the area 207 of the nonvolatile memory 300, which is addressed to a physical address mapped to the journal logical address 0x002 by the flash mapping table 240, and the journal data E' may be written to the area 207 of the nonvolatile memory 300 which is addressed to a physical address mapped to the journal logical address 0x004 by the flash mapping table 240.

When receiving a query such as PUT(0x100, A") including the target logical address 0x100 already written to the journal mapping table 164 and journal data A" from the application 140 (①), the journal manager 161 may delete, remove, or replace the pair of the target logical address 0x100 and the journal logical address 0x000 previously written to the journal mapping table 164 (②) and write a new pair of the target logical address 0x100 and a journal logical address 0x006 to the journal mapping table 164 (③).

The block aligner 163 within the host 100 may generate a journaling command REQUEST(0x006, A") by arranging the journal data A" at a start point of a sector (®). The log manager 232 within the storage device 200 may write the journal data A" to the area 207 of the nonvolatile memory 300 which is addressed to a physical address mapped to the journal logical address 0x006 by the flash mapping table 240.

Figure 13:
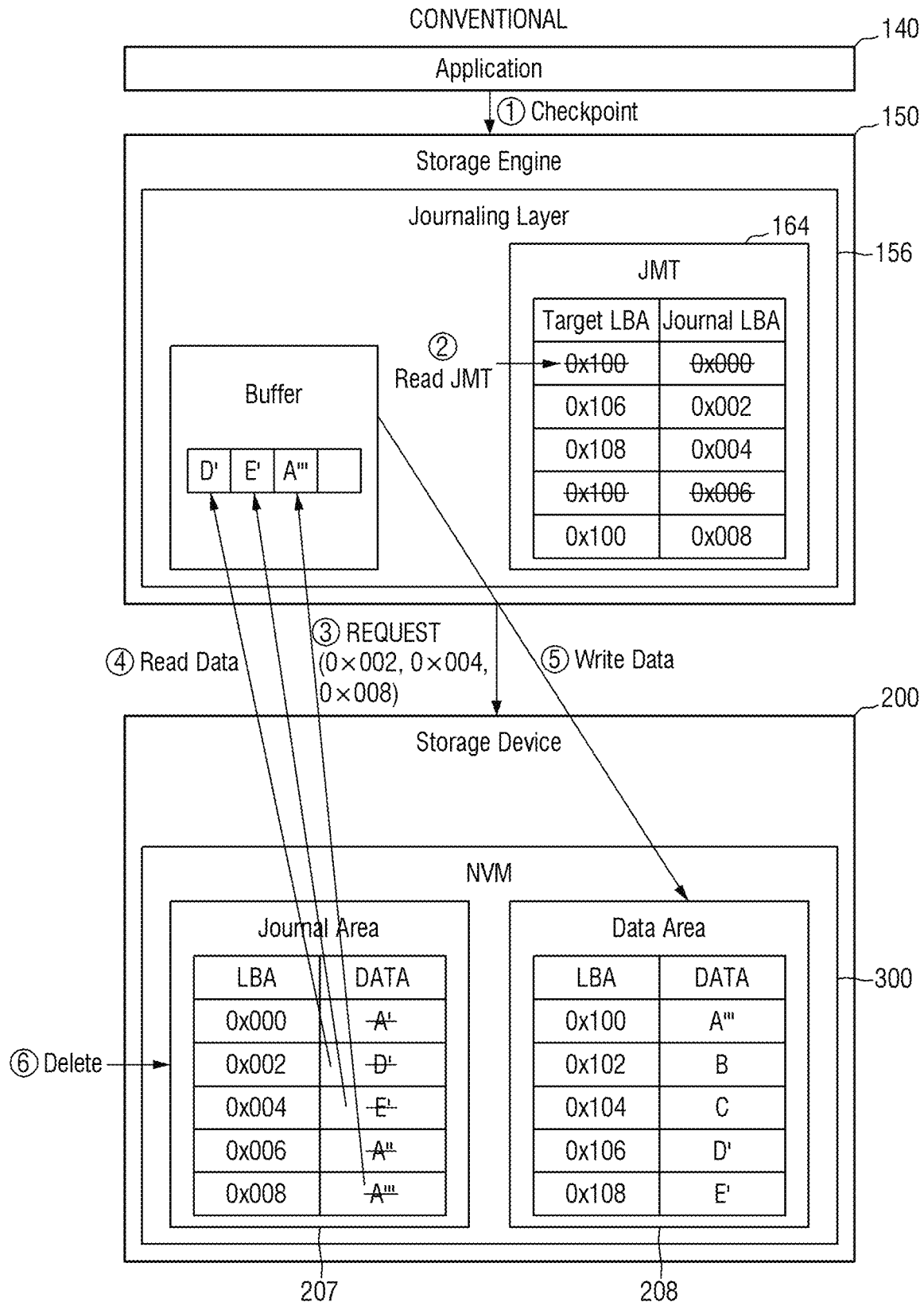
FIG. 13 is a block diagram for explaining the operation of a storage device.

FIG. 13 is a block diagram for explaining a conventional checkpointing method.

Referring to FIG. 13, in the conventional checkpointing, when receiving a checkpointing command from the application 140 (①), the storage engine 150, e.g. a storage engine within a host, reads journal logical addresses 0x002, 0x004 and 0x008 from the journal mapping table 164 (②). Then, the storage engine 150 provides a command such as REQUEST(0x002, 0x004, 0x008) for reading data stored in the journal logical addresses 0x002, 0x004 and 0x008 to the storage device 200 (③). In response to the command REQUEST(0x002, 0x004, 0x008), the storage device 200 reads an area 207 of the nonvolatile memory 300 which is addressed to physical addresses mapped to the journal logical addresses 0x002, 0x004 and 0x008 by the flash mapping table 240 and provides read data D', E' and A''' to the storage engine 150 (④). The storage engine 150 temporarily stores the read data D', E' and A''' in a buffer and provides a command for writing the read data D', E' and A''' to target logical addresses 0)(106, 0)(108 and 0x100 to the storage device 200. Accordingly, the data D', E' and A''' are written to the storage device 200 (⑤). The storage engine 150 provides a command for deleting the data A', D', E', A" and A''' written to the journal logical addresses 0x000, 0x002, 0x004, 0x006 and 0x008 to the storage device 200. In response to the command, the storage device 200 deletes the data A', D', E', A" and A''' (⑥). Accordingly, the checkpointing operation is completed.

In the conventional checkpointing, data written to a journal logical address is read again, and written to a target logical address again. Therefore, the checkpointing operation takes a long time, redundant writing of journal data is inevitable, and/or a lot of commands are provided to the storage device 200.

Figure 14:
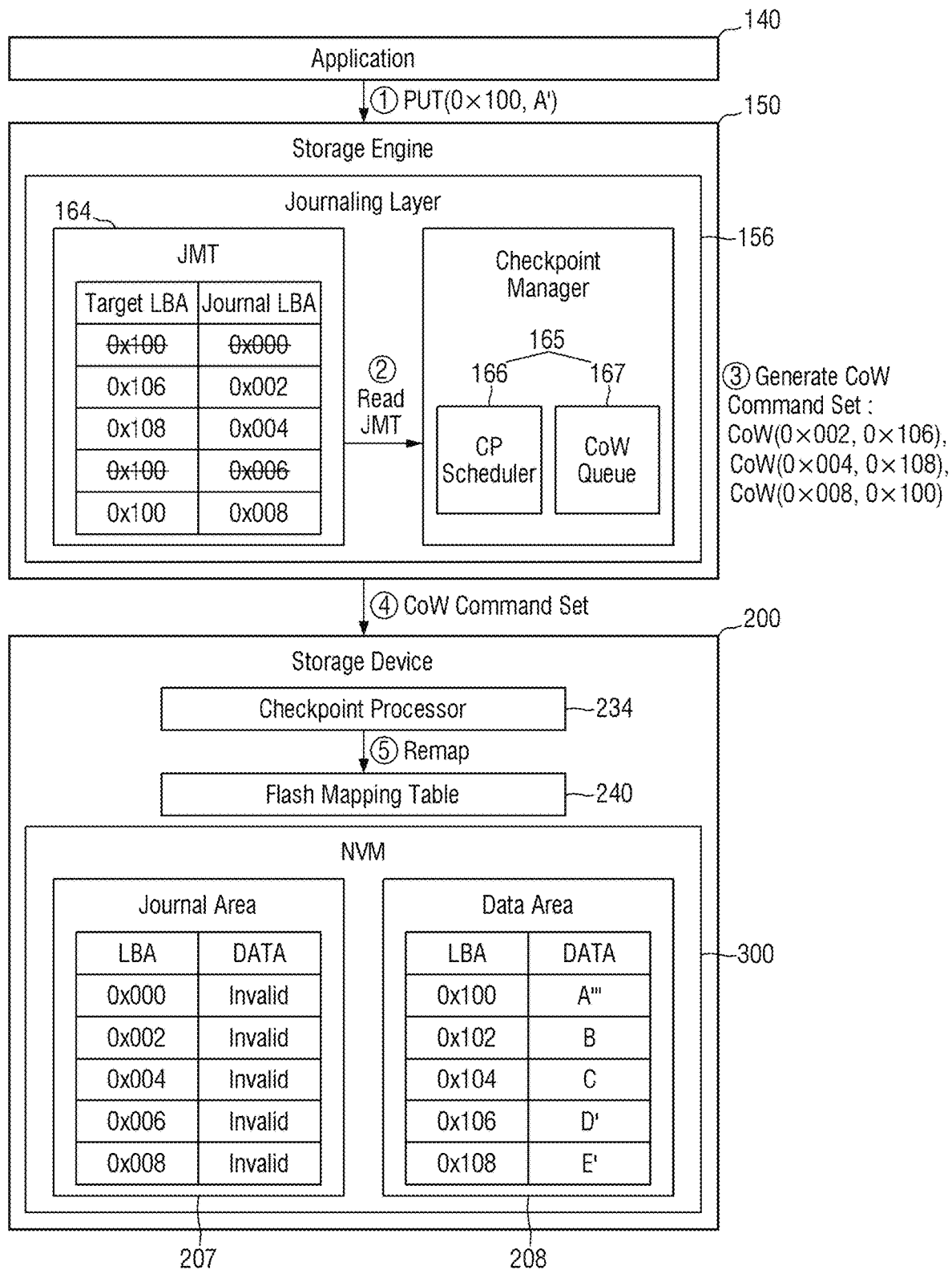

FIG. 14 is a block diagram for explaining a checkpointing method according some example embodiments. FIG. 14 is a case where the same pairs of target logical address and a journal logical address are written to the journal mapping table 164 illustrated in FIG. 13.

Referring to FIGS. 7 and 14, the checkpoint scheduler 166 within host 100 may read a pair of a target logical address 0x106 and a journal logical address 0x002, a pair of a target logical address 0)(108 and a journal logical address 0x004, and a pair of a target logical address 0x100 and a journal logical address 0x008 from the journal mapping table 164 (②).

The checkpoint scheduler 166 within the host 100 may generate checkpointing commands CoW(0x002, 0x106), CoW(0x004, 0x108) and CoW(0x008, 0x100) respectively including the read pair of the target logical address 0x106 and the journal logical address 0x002, the read pair of the target logical address 0x108 and the journal logical address 0x004, and the read pair of the target logical address 0x100 and the journal logical address 0x008 (③).

The checkpointing command queue 167 may provide the checkpointing commands CoW(0x002, 0x106), CoW (0x004, 0x108) and CoW(0x008, 0x100) as one set CoW Command Set to the storage device 200 (④).

The checkpoint processor 234 within the storage device 200 may remap the flash mapping table 240 in response to the checkpointing command CoW Command Set (⑤). Accordingly, the checkpointing operation may be finished.

Figure 15:
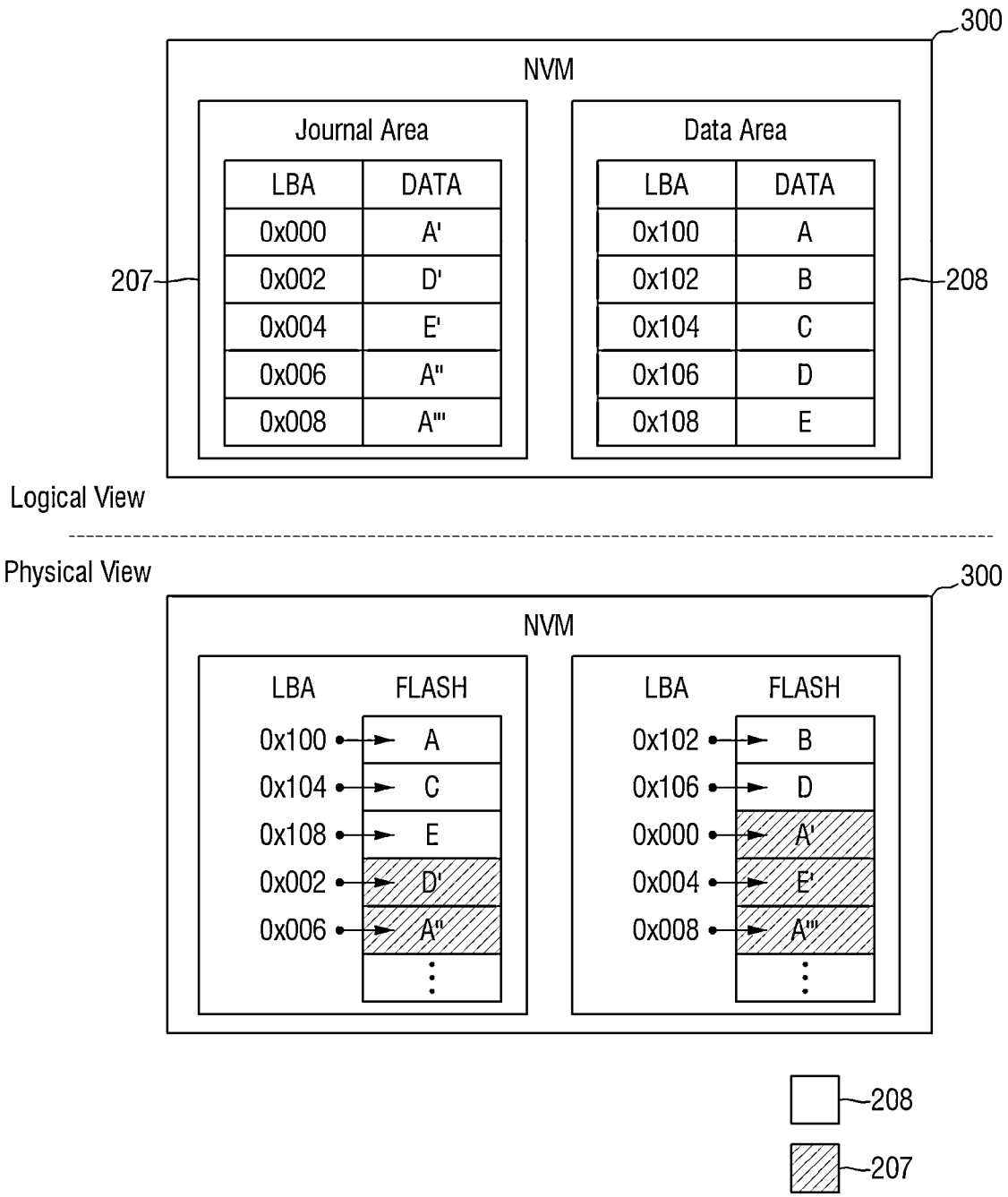
Figure 16:
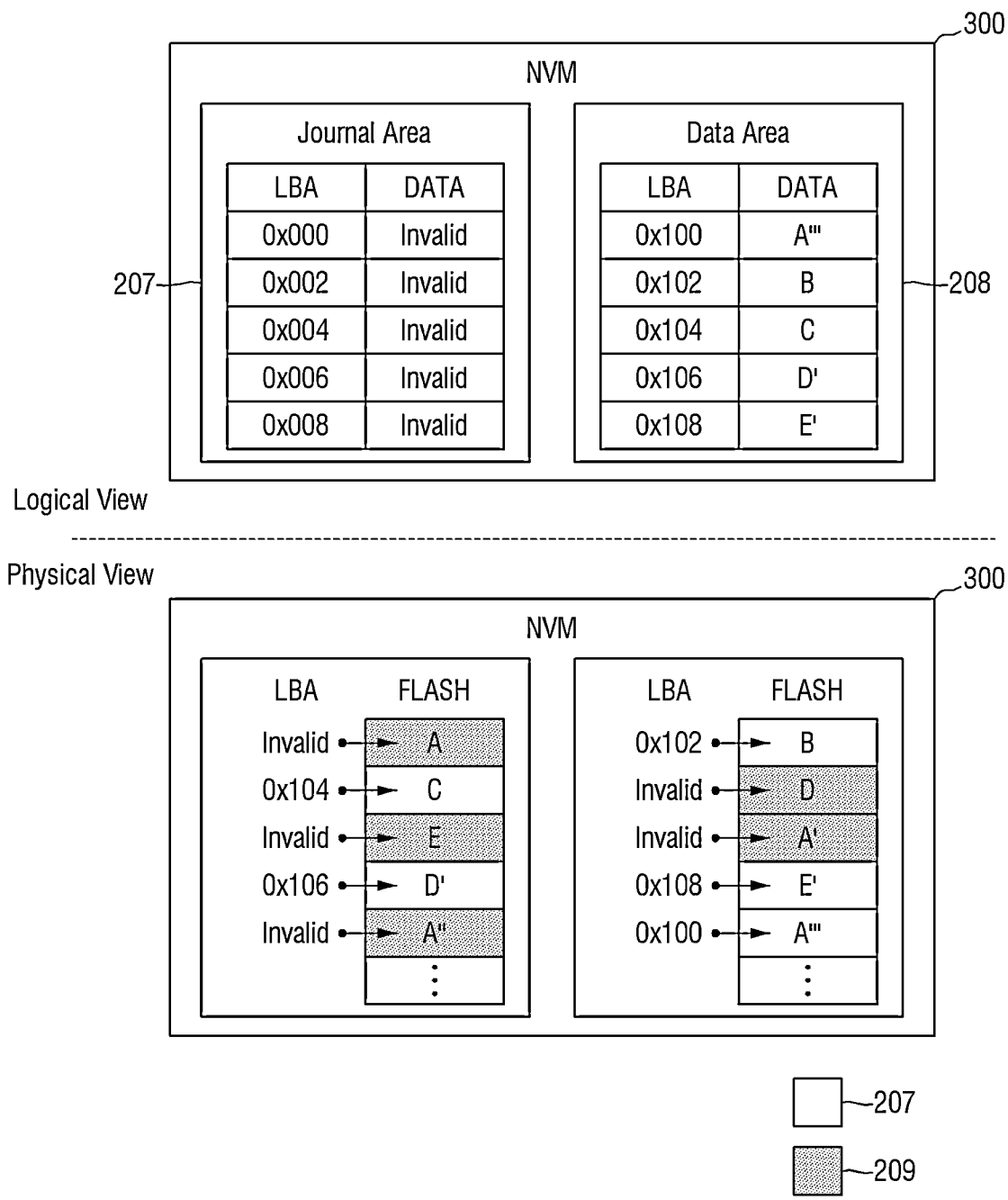

FIG. 15 illustrates the nonvolatile memory 300 before checkpointing is performed, and FIG. 16 illustrates the nonvolatile memory 300 after checkpointing is performed, according to some example embodiments.

Referring to FIG. 15, from a physical view or perspective, journal data A', D', E', A" and A'" are written to a journal area 207 of the nonvolatile memory 300 which is addressed to physical addresses mapped to journal logical addresses 0x000, 0x002, 0x004, 0x006 and 0x008 according to a first mapping state of the flash mapping table 240.

Referring to FIG. 16, the flash mapping table 240 may be updated from the first mapping state to a second mapping state. From a ligical view, target logical addresses 0x106, 0x108 and 0x100 may be mapped to physical addresses addressed to a data area 208 of the nonvolatile memory 300 according to the second mapping state of the flash mapping table 240. In addition, physical addresses mapped to the journal logical addresses 0x000, 0x002, 0x004, 0x006 and 0x008 according to the second mapping state of the flash mapping table 240 may be changed to invalid pages. For example, the journal area 207 and a data area 209 of the nonvolatile memory 300 may not be separated. According to the checkpointing, the journal area 207 may be changed to the data area 209, and the data area 209 may be changed to the journal area 207.

The storage system according to some example embodiments may off-load checkpointing from the host 100 to the storage device 200. Accordingly, there is no need or expectation to read data from the storage device 200 to the host 100 and write data from the host 100 to the storage device 200 again. Thus, the checkpointing time can be shortened. Alternatively or additionally, the storage device 200 may perform checkpointing by remapping the flash mapping table 240. Therefore, redundant writing of data does not occur, and generation of invalid pages due to checkpointing can be reduced, which, in turn, reduces the frequency of garbage collection.

For example, the storage device 200 may perform checkpointing by reusing journal data written according to a journaling command.

Figure 17A:
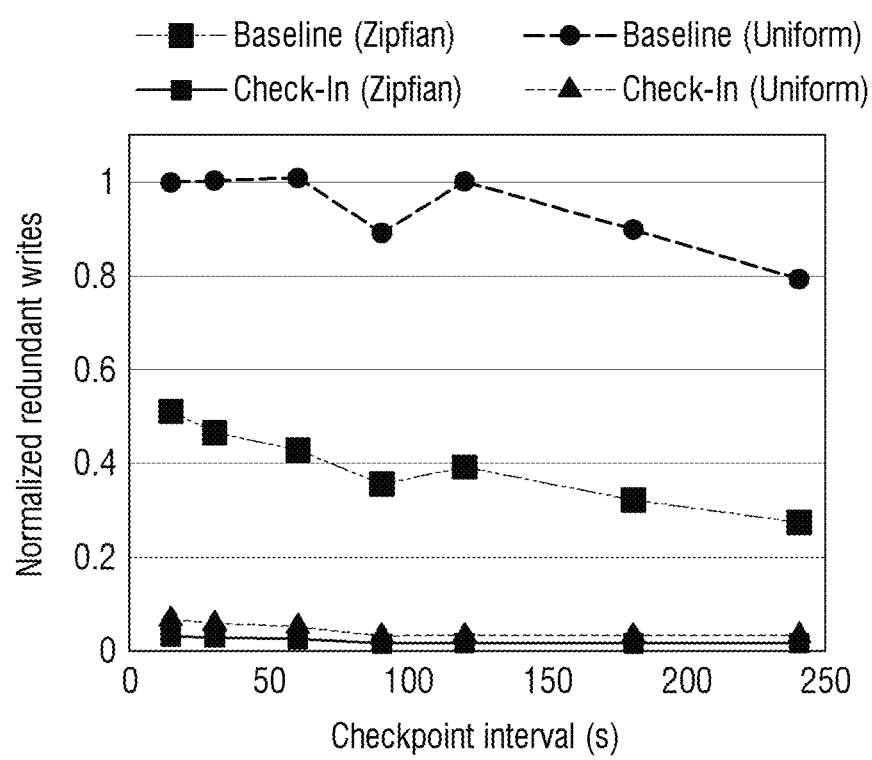
FIGS. 17A through 18B are graph for explaining effects of the storage system according to some example embodiments.
Figure 17B:
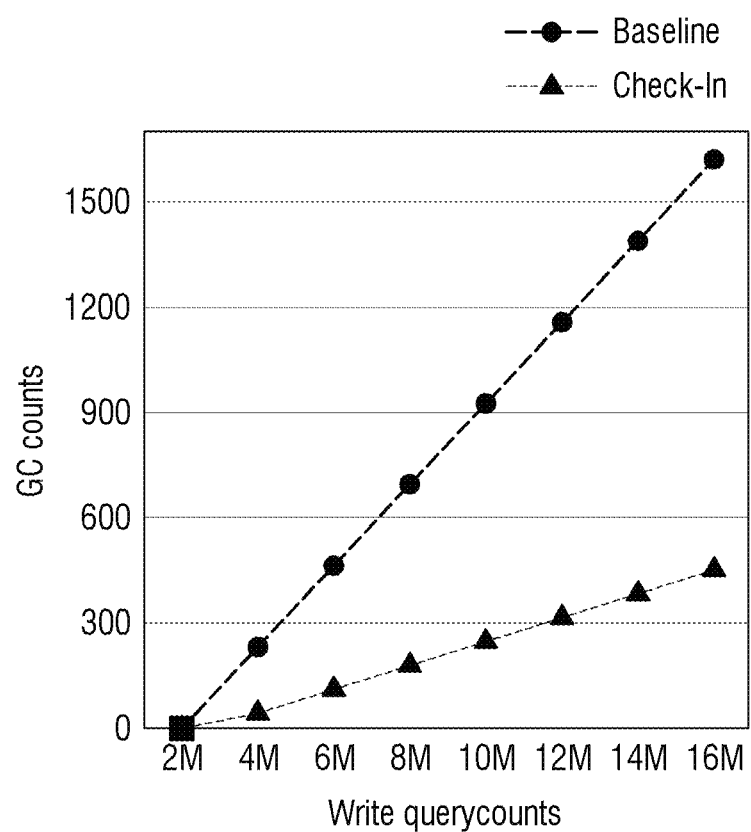
Figure 18A:
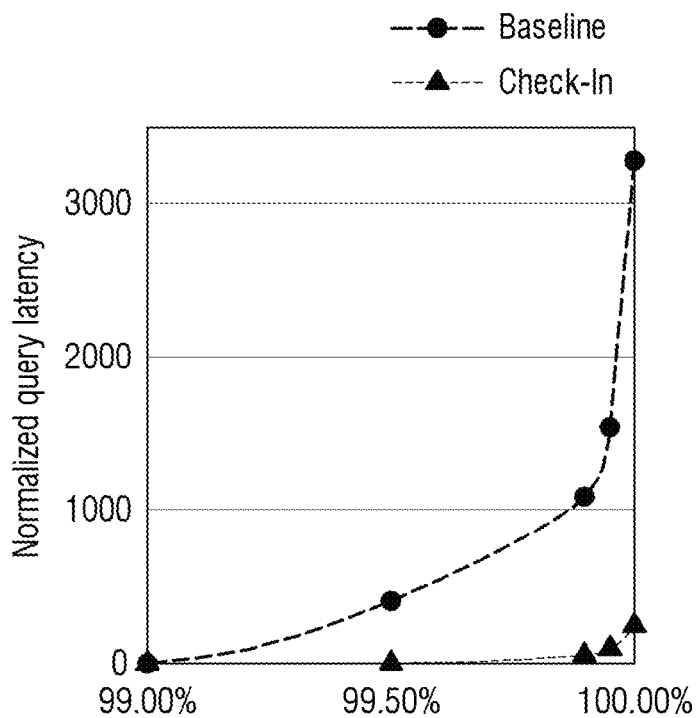
Figure 18B:
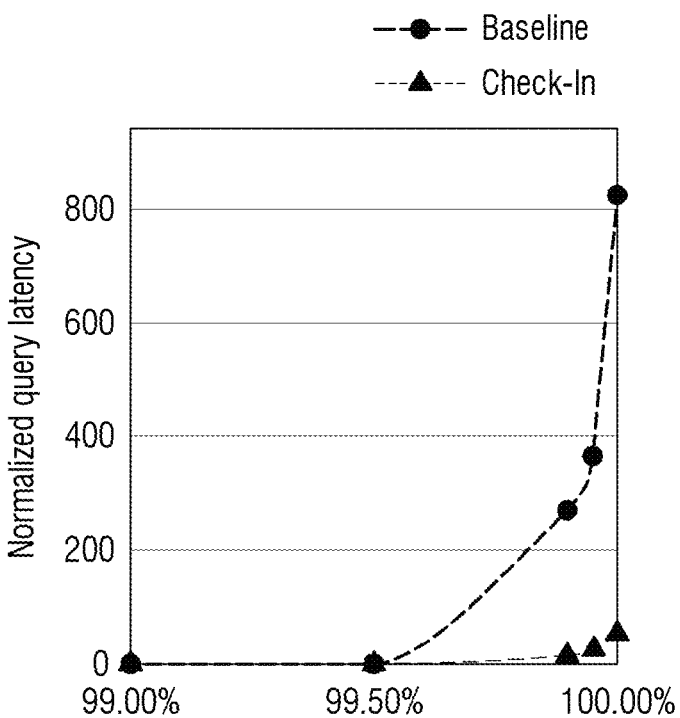

FIGS. 17A through 18B are graph for explaining effects of the storage system according to some example embodiments. In FIGS. 17 and 18, Baseline indicates a storage device not included in the storage system according to some example embodiments, and Check-In indicates a storage device included in the storage system according to some example embodiments. Zipfian indicates a case where the probability that a query will be generated for each logical address follows a normal distribution and may be associated with compression such as Zipf compression, and Uniform indicates a case where the probability that a query will be generated for each logical address is the same.

FIG. 17A illustrates the number of normalized redundant write operations of a storage device according to a checkpoint interval, and FIG. 17B illustrates the number of garbage collection operations according to the number of write queries.

Referring to FIG. 17A, the number of redundant write operations in the storage device included in the storage system according to some example embodiments may be reduced compared with the number of redundant write operations in the storage device not included in the storage system according to some example embodiments. In the case of Uniform, the number of redundant write operations (arbitrary units) in the storage device included in the storage system according to some example embodiments may be reduced by about 94% compared with the number of redundant write operations in the storage device not included in the storage system according to some example embodiments. Since the storage device included in the storage system according to some example embodiments performs checkpointing by reusing written journal data by remapping a physical address to a logical address, write amplification due to checkpointing can be improved, and/or the life of the storage device can be improved or increased.

Referring to FIG. 17B, the number of garbage collection operations with respect to the number of write queries in the storage device included in the storage system according to some example embodiments may be reduced compared with the number of garbage collection operations with respect to the number of write queries in the storage device not included in the storage system according to some example embodiments. Since the storage device included in the storage system according to some example embodiments performs checkpointing by reusing written journal data by remapping a physical address to a logical address, a reduced number of invalid pages may be generated. Therefore, the number of garbage collection operations of the storage device may be reduced, thus reducing the consumption of program/erase (P/E) cycles. Accordingly, the life of the storage device can be improved and/or increased.

FIG. 18A illustrates a normalized query response time according to tail latency in the case of Uniform. FIG. 18B illustrates a normalized query response time according to tail latency in the case of Zipfian.

Referring to FIG. 18A, in the storage device included in the storage system according to some example embodiments, a normalized query response time corresponding to 99.9-percentail tail latency may be reduced by about 92.1% in the case of Uniform. Referring to FIG. 18B, in the storage device included in the storage system according to some example embodiments, the normalized query response time corresponding to 99.9-percentail tail latency may be reduced by about 92.4% in the case of Zipfian.

When the checkpointing time increases, the speed of response to a query input to the storage system during checkpointing increases. This leads to tail latency that increases the response time to a query. However, since the checkpointing time is reduced in the storage system according to some example embodiments, the tail latency can be improved.

Figure 19:
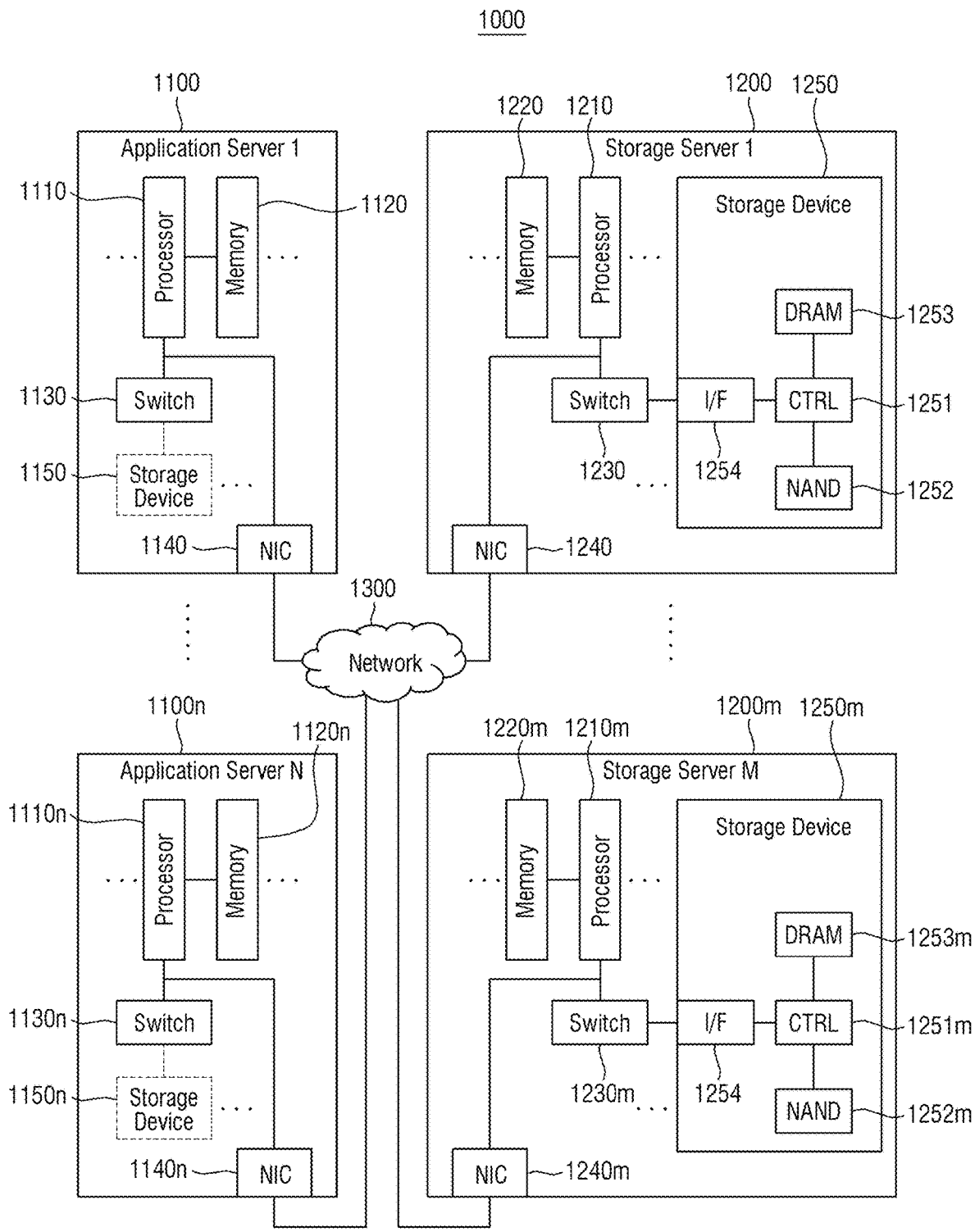
FIG. 19 illustrates a data center to which a storage device according to some example embodiments is applied.

FIG. 19 illustrates a data center 1000 to which a storage device according some example embodiments is applied.

Referring to FIG. 19, the data center 1000 is or includes a facility that collects various data and provides services and may also be referred to as a data storage center. The data center 1000 may be or include a system for operating a search engine and a database and may be a computing system used by companies such as banks or government agencies. The data center 1000 may include application servers 1100 through 1100n and storage servers 1200 through 1200m. The number of application servers 1100 through 1100n and/or the number of storage servers 1200 through 1200m may be variously selected depending on example embodiments. The number of application servers 1100 through 1100n may be different from the number of storage servers 1200 through 1200m.

The application server 1100 and/or the storage server 1200 may include at least one of a processor 1110 or 1210 and a memory 1120 or 1220. For example, in the case of the storage server 1200, the processor 1210 may control the overall operation of the storage server 1200 and access the memory 1220 to execute a command and/or data loaded in the memory 1220. According to some embodiments, the memory 1220 may include a count table. The memory 1220 may be or include at least one of a double data rate synchronous DRAM (DDR SDRAM), a high bandwidth memory (HBM), a hybrid memory cube (HMC), a dual in-line memory module (DIMM), an Optane DIMM, or a nonvolatile DIMM (NV[M]DIMM).

Depending on example embodiments, the number of processors 1210 and the number of memories 1220 included in the storage server 1200 may be variously selected. In some example embodiments, the processor 1210 and the memory 1220 may provide a processor-memory pair. In some example embodiments, the number of processors 1210 may be different from the number of memories 1220. The processor 1210 may include a single-core processor or a multi-core processor. The above description of the storage server 1200 may be similarly applied to the application server 1100.

Depending on example embodiments, the application server 1100 may not include a storage device 1150. The storage server 1200 may include one or more storage devices 1250. The number of storage devices 1250 included in the storage server 1200 may be variously selected depending on embodiments.

The application servers 1100 through 1100n and the storage servers 1200 through 1200m may communicate with each other through a network 1300. The network 1300 may be implemented using Fibre Channel (FC) and/or Ethernet. Here, the FC may be a medium used for relatively high-speed data transmission and may use an optical switch that provides high performance/high availability. The storage servers 1200 through 1200m may be provided as at least one of file storage, block storage, or object storage according to an access method of the network 1300.

In some example embodiments, the network 1300 may be a storage dedicated network such as a storage area network (SAN). For example, the SAN may be an FC-SAN using an FC network and implemented according to an FC protocol (FCP). For another example, the SAN may be an IP-SAN using a TCP/IP network and implemented according to an SCSI over TCP/IP or Internet SCSI (iSCSI) protocol. Alternatively or additionally in some example embodiments, the network 1300 may be a general network such as a TCP/IP network. For example, the network 1300 may be implemented according to a protocol such as FC over Ethernet (FCoE), network attached storage (NAS), or NVMe over Fabrics (NVMe-oF).

The application server 1100 and the storage server 1200 will hereinafter be mainly described. The description of the application server 1100 may also be applied to another application server 1100n, and the description of the storage server 1200 may also be applied to another storage server 1200m.

The application server 1100 may store data requested to be stored by a user or a client in one of the storage servers 1200 through 1200m through the network 1300. In addition, the application server 1100 may obtain data requested to be read by a user or a client from one of the storage servers 1200 through 1200m through the network 1300. For example, the application server 1100 may be implemented as a web server or a database management system (DBMS). The application server 1100 may be or correspond to or include the host of FIG. 2 described according to some embodiments.

The application server 1100 may access a memory 1120n or a storage device 1150n included in another application server 1100n through the network 1300 or may access memories 1220 through 1220m or storage devices 1250 through 1250m included in the storage servers 1200 through 1200m through the network 1300. Accordingly, the application server 1100 can perform various operations on data stored in the application servers 1100 through 1100n and/or the storage servers 1200 through 1200m.

For example, the application server 1100 may execute a command for transferring and/or copying data between the application servers 1100 through 1100n and/or the storage servers 1200 through 1200m. Here, the data may be transferred from the storage devices 1250 through 1250m of the storage servers 1200 through 1200m to the memories 1120 through 1120n of the application servers 1100 through 1100n via the memories 1220 through 1220m of the storage servers 1200 through 1200m or directly. The data transferred through the network 1300 may be data encrypted for security or privacy.

In the storage server 1200, for example, an interface 1254 may provide a physical connection between the processor 1210 and a controller 1251 and a physical connection between an NIC 1240 and the controller 1251. For example, the interface 1254 may be implemented as a direct attached storage (DAS) interface that connects the storage device 1250 directly to a dedicated cable. In addition, for example, the interface 1254 may be implemented as various interfaces such as at least one of advanced technology attachment (ATA), serial-ATA (SATA), external SATA (e-SATA), small computer system interface (SCSI), serial attached SCSI (SAS), peripheral component interconnection (PCI), PCI express (PCIe), NVM express (NVMe), IEEE 1394, universal serial bus (USB), secure digital (SD) card, multi-media card (MMC), embedded multi-media card (eMMC), universal flash storage (UFS), embedded universal flash storage (eUFS), compact flash (CF), and a card interface.

The storage server 1200 may further include a switch 1230 and the NIC 1240. The switch 1230 may selectively connect the processor 1210 and the storage device 1250 or may selectively connect the NIC 1240 and the storage device 1250 under the control of the processor 1210.

In some example embodiments, the NIC 1240 may include at least one of a network interface card, a network adapter, or the like. The NIC 1240 may be connected to the network 1300 by a wired interface, a wireless interface, a Bluetooth interface, an optical interface, or the like. The NIC 1240 may include an internal memory, a digital signal processor (DSP), a host bus interface, etc. and may be connected to the processor 1210 and/or the switch 1230 through the host bus interface. The host bus interface may be implemented as one of the above-described examples of the interface 1254. In some example embodiments, the NIC 1240 may be integrated with at least one of the processor 1210, the switch 1230, and the storage device 1250.

In a storage server (1200-1200*m*) or an application server (1100-1100*n*), a processor may send a command to a storage device (1150-1150*n*, 1250-1250*m*) and/or a memory (1120-1120*n*, 1220-1220*m*) to program and/or read data. Here, the data may be data that has been error-corrected through an error correction code (ECC) engine. The data may be data processed by data bus inversion (DBI) or data masking (DM) and may include cyclic redundancy code (CRC) information. The data may be data encrypted for security and/or privacy.

The storage device (1150-1150*n*, 1250-1250*m*) may send a control signal and a command/address signal to a NAND flash memory device (1252-1252*m*) in response to the read command received from the processor. Accordingly, when data is read from the NAND flash memory device (1252-1252*m*), a read enable (RE) signal may be input as a data output control signal, and thus the data to be output to a DQ bus. Data strobe (DQS) may be generated using the RE signal. The command and address signal may be latched in a page buffer according to a rising edge or a falling edge of a write enable (WE) signal.

The controller 1251 may control the overall operation of the storage device 1250. In some example embodiments, the controller 1251 may include an SRAM. The controller 1251 may write data to a NAND flash memory device 1252 in response to a write command or may read data from the NAND flash memory device 1252 in response to a read command. For example, the write command and/or the read command may be provided from the processor 1210 in the storage server 1200, a processor 1210*m* in another storage server 1200*m*, or processors 1110 and 1110*n* in the application servers 1100 and 1100*n*. A DRAM 1253 may temporarily store (buffer) data to be written to the NAND flash memory device 1252 or data read from the NAND flash memory device 1252. In addition, the DRAM 1253 may store metadata. Here, the metadata is user data or data generated by the controller 1251 to manage the NAND flash memory device 1252. The storage device 1250 may include a secure element (SE) for security or privacy. The metadata may include a count table according to some embodiments.

Any or all of the elements disclosed above may include or be implemented in processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

While inventive concepts has been particularly shown and described with reference to some example embodiments thereof, it will be understood by those of ordinary skill in the art that various changes in form and detail may be made therein without departing from the spirit and scope of inventive concepts as defined by the following claims. Example embodiments should be considered in a descriptive sense only and not for purposes of limitation.

What is claimed is:

1. A storage system comprising:
   a storage device comprising a nonvolatile memory, the nonvolatile memory configured to store data at physical addresses, the physical addresses including a first physical address and a second physical address; and
   a host comprising a host processing circuitry configured to (A) insert a first journal logical address and a first target logical address into a journal mapping table, to (B) generate a journaling command by arranging first journal data in a log page in sectors, the sectors addressed to the first target logical address, and to (C) generate a checkpointing command comprising the first target logical address and the first journal logical address, the host including a storage engine configured to send the journaling command as a request to the storage device, the request including a computer-readable instruction, data, and the first journal logical address,
   wherein the storage device includes,
   a flash mapping table configured to store a first mapping state in which the first journal logical address maps to the first physical address, and the first target logical address maps to the second physical address, and
   a storage device processing circuitry configured to (D) write the first journal data arranged in sectors to an area of the nonvolatile memory, which is addressed to the first physical address corresponding to the first journal logical address according to the first mapping state, the writing in response to the journaling command, and to (E) change the first mapping state of the flash mapping table to a second mapping state, in which the first target logical address is remapped to the first physical address, the changing in response to the checkpointing command.

2. The storage system of claim 1, wherein the physical addresses further include a third physical address and a fourth physical address,
   the log page comprises a first sector and a second sector, the first sector and the second sector arranged in sectors,
   the host processing circuitry is further configured to (A) insert a second journal logical address and a second target logical address into the journal mapping table and (B) to generate the log page by arranging first journal data having a smaller size than each sector in the first sector and arranging second journal data having a smaller size than each sector in the second sector, (C) to generate the checkpointing command, wherein the checkpointing command includes the second target logical address and the second journal logical address,
   the first mapping state corresponds to a state in which the second journal logical address further maps to the third physical address, and the second target logical address further maps to the fourth physical address, the storage device processing circuitry is configured to write the second journal data included in the log page to the third physical address of the nonvolatile memory which corresponds to the second journal logical address according to the first mapping state, and the second mapping state corresponds to a state in which the second target logical address remaps to the third physical address.

3. The storage system of claim 1, wherein the physical addresses further include a third physical address and a fourth physical address, the log page comprises a first sector, a second sector, and a third sector, each of the first sector, the second sector, and the third sector arranged sectors, the host processing circuitry is further configured to insert a second journal logical address into the journal mapping table and to insert a second target logical address into the journal mapping table, and to generate the log page by arranging first journal data having a smaller size than each sector in the first sector and arranging second journal data having a larger size than each sector in the second sector and the third sector, the host processing circuitry is configured to generate the checkpointing command further comprising the second target logical address and the second journal logical address, the first mapping state corresponds to a state in which the second journal logical address further maps to the third physical address, and the second target logical address further maps to the fourth physical address, the storage device processing circuitry is further configured to write the second journal data included in the log page to an area of the nonvolatile memory which is addressed to the second physical address corresponding to the second journal logical address according to the first mapping state, and the second mapping state corresponds to a state in which the second target logical address remaps to the third physical address.

4. The storage system of claim 3, wherein the host processing circuitry is configured to arrange the second journal data at a start point of the second sector.

5. The storage system of claim 1, wherein the log page comprises a first sector and a second sector, the first sector and the second sector arranged sectors, the first journal data has a larger size than each sector, and the host processing circuitry is configured to arrange the first journal data at a start point of the first sector.

6. The storage system of claim 1, wherein the host processing circuitry is configured to generate an input query comprising the first journal data and the first target logical address, and the journal manager generates the log page in response to the input query.

7. The storage system of claim 1, wherein a size of the first journal data is not a multiple of a size of each sector.

8. The storage system of claim 7, wherein the host processing circuitry is configured to generate an input query comprising the first journal data and a first key corresponding to the first journal data,
to map the first key to the first target logical address, and
to generate the log page in response to the input query.

9. The storage system of claim 8, wherein the host processing circuitry is configured to generate the input query as a key-value structure in which a value is stored in a key corresponding to the value.

10. The storage system of claim 1, wherein the host processing circuitry is configured to generate the checkpointing command (A) in response to an insertable capacity of the journal mapping table being equal to or greater than a set capacity value or (B) according to a set cycle.

11. A method of operating a storage system, the method comprising:
inserting a first journal logical address, a first target logical address, a second journal logical address, and a second target logical address into a journal mapping table in a host, the host including a storage engine configured to send a journaling command as a request to a storage device, the request including a computer-readable instruction, data, and the first journal logical address;
generating a log page by arranging first journal data and second journal data in sectors, the sectors addressed to the first target logical address and the second target logical address;
writing the first journal data included in the log page to an area of a nonvolatile memory which is addressed to a first physical address that is mapped to the first journal logical address according to a flash mapping table;
writing the second journal data included in the log page to an area of the nonvolatile memory which is addressed to a second physical address that is mapped to the second journal logical address according to the flash mapping table;
generating a checkpointing command which comprises the first target logical address, the first journal logical address, the second target logical address, and the second journal logical address; and
in response to the checkpointing command, updating the flash mapping table by remapping the first physical address to the first target logical address and remapping the second physical address to the second target logical address.

12. The method of claim 11, wherein the log page comprises a first sector and a second sector, the first sector and the second sector arranged in sectors, each of the first journal data and the second journal data has a smaller size than each of the first and second sectors, and the generating of the log page comprises arranging the first journal data in the first sector and arranging the second journal data in the second sector.

13. The method of claim 11, wherein the log page comprises a first sector, a second sector, and a third sector, the first sector, the second sector, and the third sector arranged in sectors, the first journal data has a smaller size than each of the sectors, the second journal data has a larger size than each of the first through third sectors, and the generating of the log page comprises arranging the first journal data in the first sector and arranging the second journal data in the second sector and the third sector.

14. The method of claim 13, wherein the second journal data is arranged at a start point of the second sector.

15. The method of claim 11, wherein the log page comprises a first sector, a second sector, and a third sector, the first sector, the second sector, and the third sector arranged in sectors, the first journal data has a size larger than the size of each of the first through third sectors and smaller than twice the size of each of the first through third sectors, the second journal data has a larger size than each of the first through third sectors, and the generating of the log page comprises arranging the first journal data in the first sector and the second sector and arranging the second journal data in the third sector.

16. The method of claim 15, wherein the first journal data is arranged at a start point of the first sector, and the second journal data is arranged at a start point of the third sector.

17. The method of claim 11, wherein the checkpointing command is generated according to an insertable capacity of the journal mapping table or a set cycle.

18. The method of claim 11, further comprising:
receiving an input query which comprises (A) the first journal data, (B) a first key corresponding to the first journal data, (C) the second journal data, and (D) a second key corresponding to the second journal data, wherein the log page is generated in response to the input query.

19. The method of claim 18, wherein the input query is received from a database having a key-value structure in which a value is stored in a key corresponding to the value.

20. A storage device comprising:
a nonvolatile memory configured to store data at physical addresses, the physical addresses including a first physical address and a second physical address; and
a memory controller circuitry comprising a flash mapping table storing a first mapping state in which a first journal logical address is mapped to the first physical address, and a first target logical address is mapped to the second physical address,
wherein the nonvolatile memory is configured to receive a log page comprising first journal data and to write the first journal data to the first physical address which corresponds to the first journal logical address according to the first mapping state stored in the flash mapping table, and the memory controller circuitry is configured to receive a checkpointing command comprising the first journal logical address and the first target logical address and to change the first mapping state of the flash mapping table to a second mapping table in which the first target logical address is remapped to the first physical address, the changing being in response to the checkpointing command, the storage device configured to receive a journaling command as a request, the request including a computer-readable instruction, data, and the first journal logical address.

* * * * *